US012647527B2

(12) United States Patent
Kiriyama et al.

(10) Patent No.: US 12,647,527 B2
(45) Date of Patent: Jun. 2, 2026

(54) SWITCHER DEVICE, CONTROL METHOD, AND IMAGING SYSTEM

(71) Applicant: Sony Group Corporation, Tokyo (JP)

(72) Inventors: Hiroshi Kiriyama, Kanagawa (JP); Masaki Hirose, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/861,600

(22) PCT Filed: Apr. 19, 2023

(86) PCT No.: PCT/JP2023/015647
§ 371 (c)(1),
(2) Date: Oct. 30, 2024

(87) PCT Pub. No.: WO2023/223758
PCT Pub. Date: Nov. 23, 2023

(65) Prior Publication Data
US 2025/0301100 A1      Sep. 25, 2025

(30) Foreign Application Priority Data
May 20, 2022    (JP) ................................. 2022-083040

(51) Int. Cl.
*H04N 5/268*         (2006.01)
*H04N 23/667*        (2023.01)
*H04N 23/90*         (2023.01)

(52) U.S. Cl.
CPC ........... *H04N 5/268* (2013.01); *H04N 23/667* (2023.01); *H04N 23/90* (2023.01)

(58) Field of Classification Search
CPC ...... H04N 5/268; H04N 23/667; H04N 23/90; H04N 5/2224; H04N 5/265; H04N 23/60; H04N 13/282; G06F 3/1446
See application file for complete search history.

(56) References Cited

U.S. PATENT DOCUMENTS

2009/0102957 A1      4/2009  Phelan
2011/0304735 A1*    12/2011  Van Eaton ............. H04N 5/262
                                                         348/E7.085
(Continued)

FOREIGN PATENT DOCUMENTS

EP            3355586 A1     8/2018
JP        2002-199252 A      7/2002
(Continued)

OTHER PUBLICATIONS

Brompton Technologies, "User Manual Tessera Processing Verision 3.3", Mar. 11, 2022 (Mar. 11, 2022), XP093294691.
(Continued)

*Primary Examiner* — Nhan T Tran
(74) *Attorney, Agent, or Firm* — Paratus Law Group, PLLC

(57)        ABSTRACT

A switcher device includes: a first switch unit that receives, as video data to be displayed on a display, a plurality of pieces of video data including video content corresponding to each of a plurality of cameras as input, selects one of the plurality of pieces of video data, and outputs the selected video data; a second switch unit that receives a plurality of pieces of video data obtained by capturing a video displayed on the display by the plurality of cameras as input, selects one of the plurality of pieces of video data, and outputs the selected video data; and a control unit. The control unit performs control to cause the first switch unit to execute switching of the video data in response to a trigger of video switching, and, after a predetermined switching delay time, to cause the second switch unit to execute switching to video data by the camera corresponding to the video data after switching in the first switch unit.

15 Claims, 21 Drawing Sheets

(56) References Cited

U.S. PATENT DOCUMENTS

2019/0110004 A1*  4/2019  Pipher .................. H04N 5/2628
2020/0145644 A1     5/2020  Cordes et al.
2021/0072946 A1*  3/2021  Chang .................. H04N 13/282
2021/0321032 A1* 10/2021  Braun ...................... H04N 5/04
2023/0110191 A1*  4/2023  Popp ........................ H04N 9/30
                                                                       386/343

FOREIGN PATENT DOCUMENTS

JP          2003-298936  A     10/2003
JP          2008-092120  A      4/2008

OTHER PUBLICATIONS

Gerd Voigt-Müller: "Neue Technologie für variable Bandenwerbung in Stadien-film-tv-video.de",May 18, 2021 (May 18, 2021), XP093294316.
Megapixel Visual Reality: "Megapixel Technology Overview GhostFrame(TM) on the HELIOS LED Processing Platform", , G09G Feb. 28, 2022 (Feb. 28, 2022), pp. 1-34, G09F XP093294708.
Tom Williams: "Final Pixel praises benefits of Brompton's frame remapping feature for VP shoots",Apr. 5, 2022 (Apr. 5, 2022), XP093294315.

* cited by examiner

SWITCHER DEVICE, CONTROL METHOD, AND IMAGING SYSTEM

CROSS REFERENCE TO PRIOR APPLICATION

This application is a National Stage Patent Application of PCT International Patent Application No. PCT/JP2023/015647 (filed on Apr. 19, 2023) under 35 U.S.C. § 371, which claims priority to Japanese Patent Application No. 2022-083040 (filed on May 20, 2022), which are all hereby incorporated by reference in their entirety.

TECHNICAL FIELD

The present technology relates to a switcher device for video data, a method for controlling a switcher device, and an imaging system including a switcher device.

BACKGROUND ART

As an imaging method for producing a video content such as a movie, a technology is known in which a performer performs acting with what is called a green back and then a background video is synthesized.

Furthermore, in recent years, instead of green back shooting, an imaging system has been developed in which, in a studio provided with a large display, a background video is displayed on the display, and a performer performs acting in front thereof, whereby the performer and the background can be imaged, and the imaging system is known as what is called virtual production, in-camera VFX, or light emitting diode (LED) wall virtual production.

Patent Document 1 below discloses a technology of a system that images a performer acting in front of a background video.

CITATION LIST

Patent Document

Patent Document 1: US Patent Application Publication No. 2020/0145644 A

SUMMARY OF THE INVENTION

Problems to be Solved by the Invention

When a background video is displayed on a large display, and then a performer and a background video are captured with a camera, there is no need to separately synthesize the background video after the capturing, and the performer and staff can visually understand the scene and perform acting or determine whether the acting is good or bad, or the like, which are more advantageous than green back shooting.

However, the appearance of the background should be different according to the position of the camera with respect to the display and the imaging direction. When only the background video is simply projected, the background does not change even if the position of the camera, the imaging direction, and the like are different, and the video becomes rather unnatural. Therefore, by changing the background video (at least the video in the range within the angle of view of the camera in the display) so as to be equivalent to the appearance of the actual three-dimensional space according to the position of the camera, the imaging direction, and the like, it is possible to capture a video equivalent to the case of imaging at the actual location.

However, in a case where a plurality of cameras is used, since the positions of the cameras are physically different, backgrounds suitable for the respective cameras may overlap on the display, or when the camera as a main line video is switched by the switcher, a background video of another camera may be projected.

Therefore, the present disclosure proposes a technique for obtaining an appropriate video in a system in which a video displayed on a display is captured by a plurality of cameras and a main line video is switched by a switcher.

Solutions to Problems

A switcher device according to the present technology includes: a first switch unit that receives, as video data to be displayed on a display, a plurality of pieces of video data including video content corresponding to each of a plurality of cameras as input, selects one of the plurality of pieces of video data, and outputs the selected video data; a second switch unit that receives a plurality of pieces of video data obtained by capturing a video displayed on the display by the plurality of cameras as input, selects one of the plurality of pieces of video data, and outputs the selected video data; and a control unit that performs control to cause the first switch unit to execute switching of video data in response to a trigger of video switching, and, after a predetermined switching delay time elapses, to cause the second switch unit to execute switching to video data by a camera corresponding to the video data after the switching in the first switch unit.

In the case of imaging with a plurality of cameras, for example, a background video or the like with video content corresponding to the position and viewing direction of each camera is prepared, and selectively supplied to the display via the switcher device to be displayed. Each camera captures a video of the display, and the second switch unit selects and outputs the video. In this case, after switching of the first switch unit, the second switch unit is switched after a predetermined switching delay time.

BRIEF DESCRIPTION OF DRAWINGS

FIG. 2 is an explanatory diagram of a background video according to a camera position of the imaging system of the embodiment.

FIG. 3 is an explanatory diagram of a background video according to a camera position of the imaging system of the embodiment.

FIG. 5 is a block diagram of the imaging system of the embodiment.

FIG. 10 is a block diagram of a first configuration example including a switcher of the embodiment.

FIG. 13 is a block diagram of a second configuration example including the switcher of the embodiment.

FIG. 15 is a block diagram of a third configuration example including the switcher of the embodiment.

FIG. 19 is an explanatory diagram of exposure of a rolling shutter system.

FIG. 20 is an explanatory diagram of video signals output by a rolling shutter system and a global shutter system.

MODE FOR CARRYING OUT THE INVENTION

Figure 1:
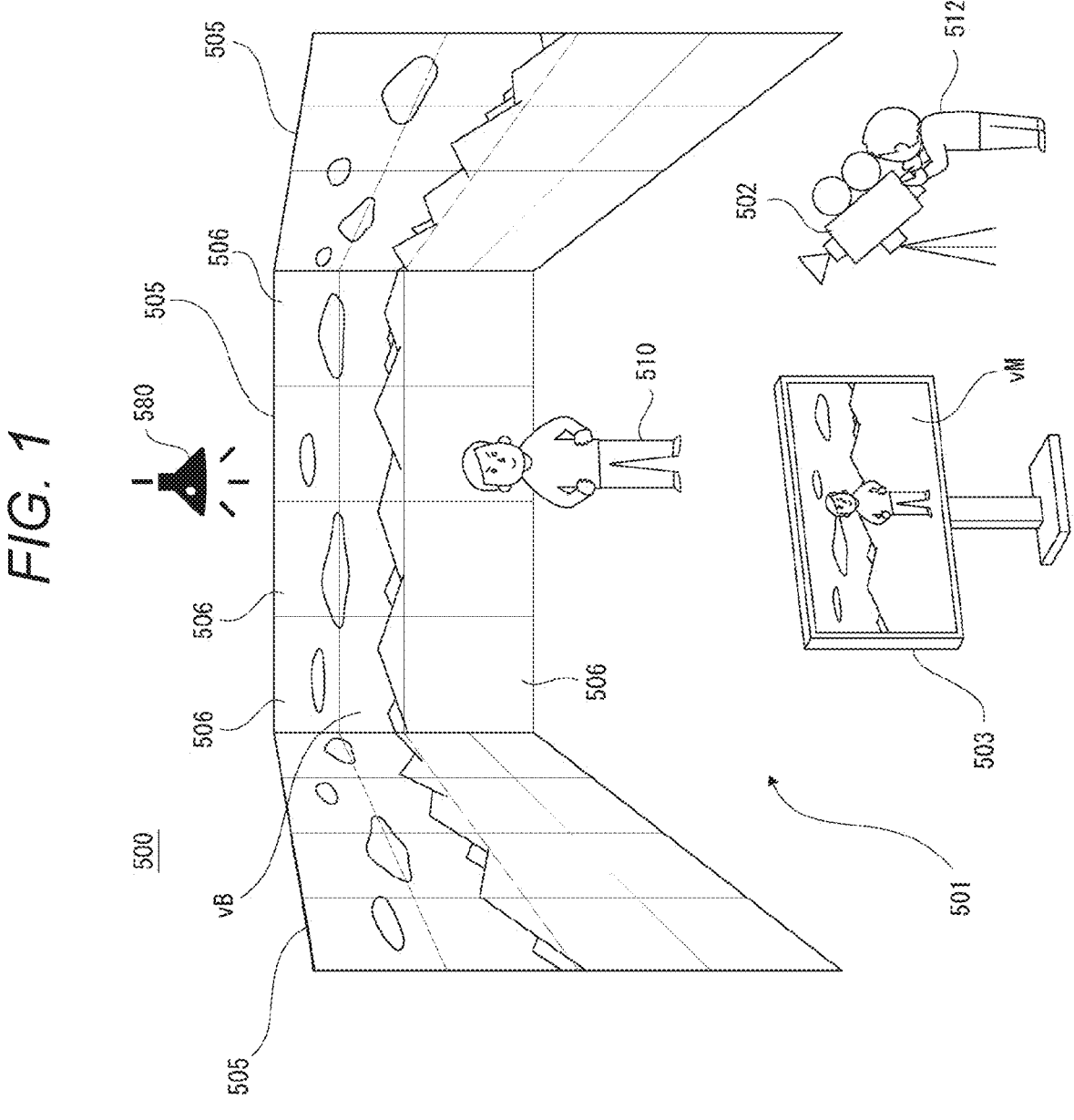
FIG. 1 is an explanatory diagram of an imaging system of an embodiment of the present technology.

Hereinafter, embodiments will be described in the following order.
<1. Imaging System and Content Production>
<2. Configuration of Information Processing Device>
<3. Imaging System using a Plurality of Cameras and Switcher>
<4. Delay Time Setting Process>
<5. Shutter System>
<6. Summary and Modifications>

Note that, in the present disclosure, "video" or "image" includes both a still image and a moving image. Furthermore, "video" refers not only to a state in which the video is displayed on a display, but also video data in a state in which the video data is not displayed on a display may be comprehensively referred to as "video".

For example, in the embodiments, a background video before being displayed on a display, a video captured by a camera, and a background video or a captured video switched by a switcher are not a video actually being displayed but video data. Such video data is referred to as "background video", "captured video", or the like for convenience.

Furthermore, a plurality of cameras, circuit units, functions, signals, and the like are denoted by adding "a", "b", "c", . . . to the reference numerals to be written as "camera 502*a*" and "camera 502*b*", and when being collectively referred to, only the reference numerals excluding "a", "b", and "c", such as "camera 502", are used.
<1. Imaging System and Video Content Production>

An imaging system to which the technology of the present disclosure can be applied and production of a video content will be described.

FIG. 1 schematically illustrates an imaging system 500. The imaging system 500 is a system that performs imaging as virtual production, and a part of equipment arranged in an imaging studio is illustrated in the drawing.

In the imaging studio, a performance area 501 in which a performer 510 performs performance such as acting is provided. A large display device is arranged on at least the back surface, the left and right side surfaces, and the upper surface of the performance area 501. Although the device type of the display device is not limited, the drawing illustrates an example in which an LED wall 505 is used as an example of the large display device.

One LED wall 505 forms a large panel by vertically and horizontally connecting and arranging a plurality of LED panels 506. The size of the LED wall 505 is not particularly limited, but only needs to be a size that is necessary or sufficient as a size for displaying a background when the performer 510 is imaged.

A necessary number of lights 580 are arranged at necessary positions such as above or on the side of the performance area 501 to illuminate the performance area 501.

In the vicinity of the performance area 501, for example, a camera 502 for imaging a movie or other video content is arranged. A camera operator 512 can move the position of the camera 502, and can perform an operation of an imaging direction, an angle of view, or the like. Of course, it is also conceivable that movement, angle of view operation, or the like of the camera 502 is performed by remote control. Furthermore, the camera 502 may automatically or autonomously move or change the angle of view. For this reason, the camera 502 may be mounted on a camera platform or a mobile body.

The camera 502 collectively captures the performer 510 in the performance area 501 and the video displayed on the LED wall 505. For example, by displaying a scene as a background video vB on the LED wall 505, it is possible to capture a video similar to that in a case where the performer 510 actually exists and performs acting at the place of the scene.

An output monitor 503 is arranged near the performance area 501. The video being captured by the camera 502 is displayed on the output monitor 503 in real time as a monitor video vM. As a result, a director and staff who produce a video content can check the captured video.

As described above, the imaging system 500 that images performance of the performer 510 in the background of the LED wall 505 in the imaging studio has various advantages as compared with the green back shooting.

For example, in the case of the green back shooting, it is difficult for the performer to imagine the background and the situation of the scene, which may affect the acting. On the other hand, by displaying the background video vB, the performer 510 can easily perform acting, and the quality of acting is improved. Furthermore, it is easy for the director and other staff members to determine whether or not the acting of the performer 510 matches the background or the situation of the scene.

Furthermore, post-production after imaging is more efficient than in the case of the green back shooting. This is because what is called a chroma key composition may be unnecessary or color correction or reflection composition may be unnecessary. Furthermore, even in a case where the chroma key composition is required at the time of imaging, the background screen does not need to be added, which is also helpful to improve efficiency.

In the case of the green back shooting, the hue of the green increases on the performer's body, dress, and objects, and thus correction thereof is necessary. Furthermore, in the case of the green back shooting, in a case where there is an object in which a surrounding scene is reflected, such as glass, a mirror, or a snowdome, it is necessary to generate and synthesize an image of the reflection, but this is troublesome work.

On the other hand, in a case of imaging by the imaging system 500 in FIG. 1, the hue of the green does not increase, and thus the correction is unnecessary. Furthermore, by displaying the background video vB, the reflection on the actual article such as glass is naturally obtained and captured, and thus, it is also unnecessary to synthesize the reflection video.

Here, the background video vB will be described with reference to FIGS. 2 and 3. Even if the background video vB is displayed on the LED wall 505 and captured together with the performer 510, the background of the captured video becomes unnatural only by simply displaying the background video vB. This is because a background that is three-dimensional and has depth is actually used as the background video vB in a planar manner.

For example, the camera 502 can image the performer 510 in the performance area 501 from various directions, and can also perform a zoom operation. The performer 510 also does not stop at one place. Then, the actual appearance of the background of the performer 510 should change according to the position, the imaging direction, the angle of view, and the like of the camera 502, but such a change cannot be obtained in the background video vB as the planar video. Accordingly, the background video vB is changed so that the background is similar to the actual appearance including a parallax.

Figure 2:
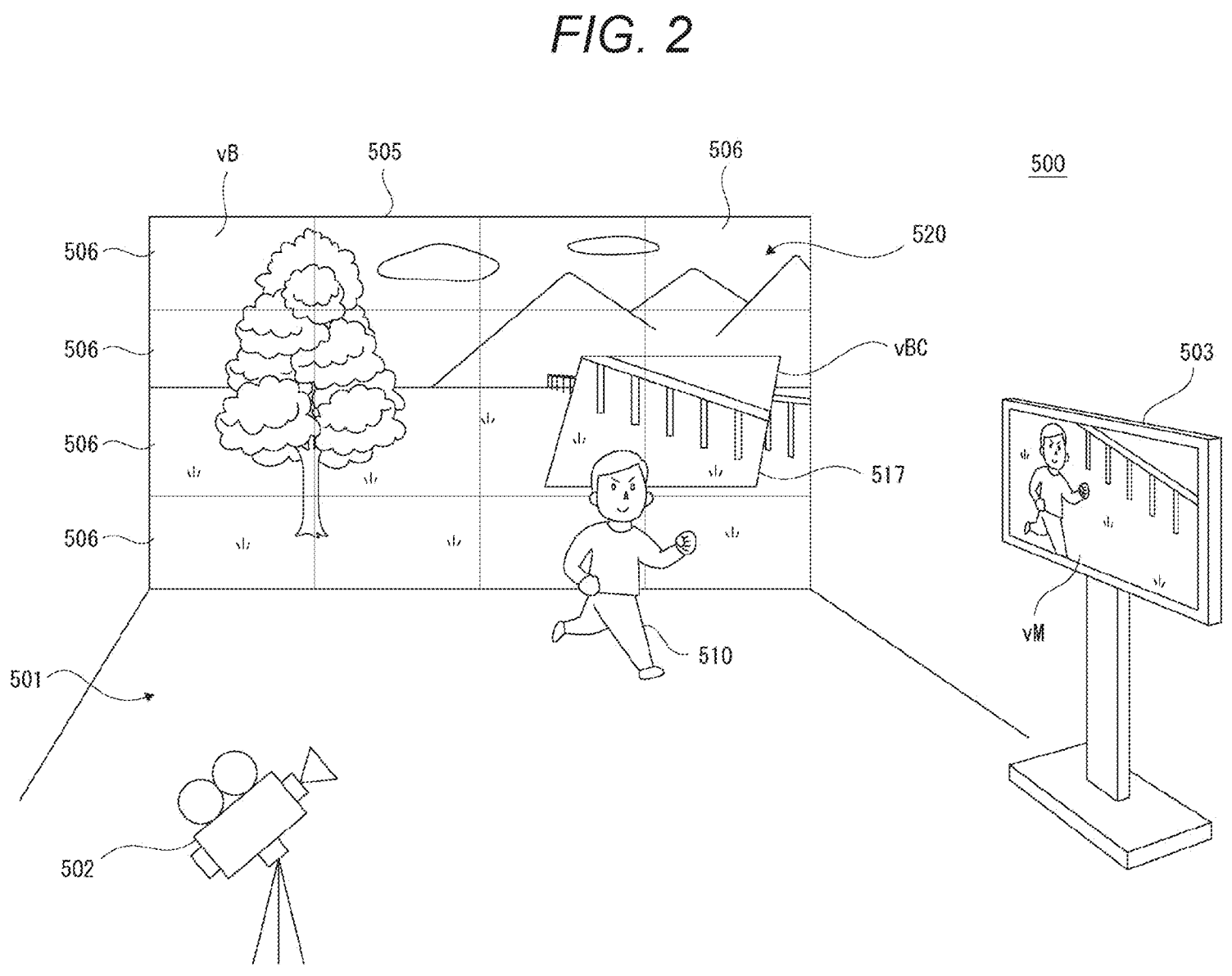
Figure 3:
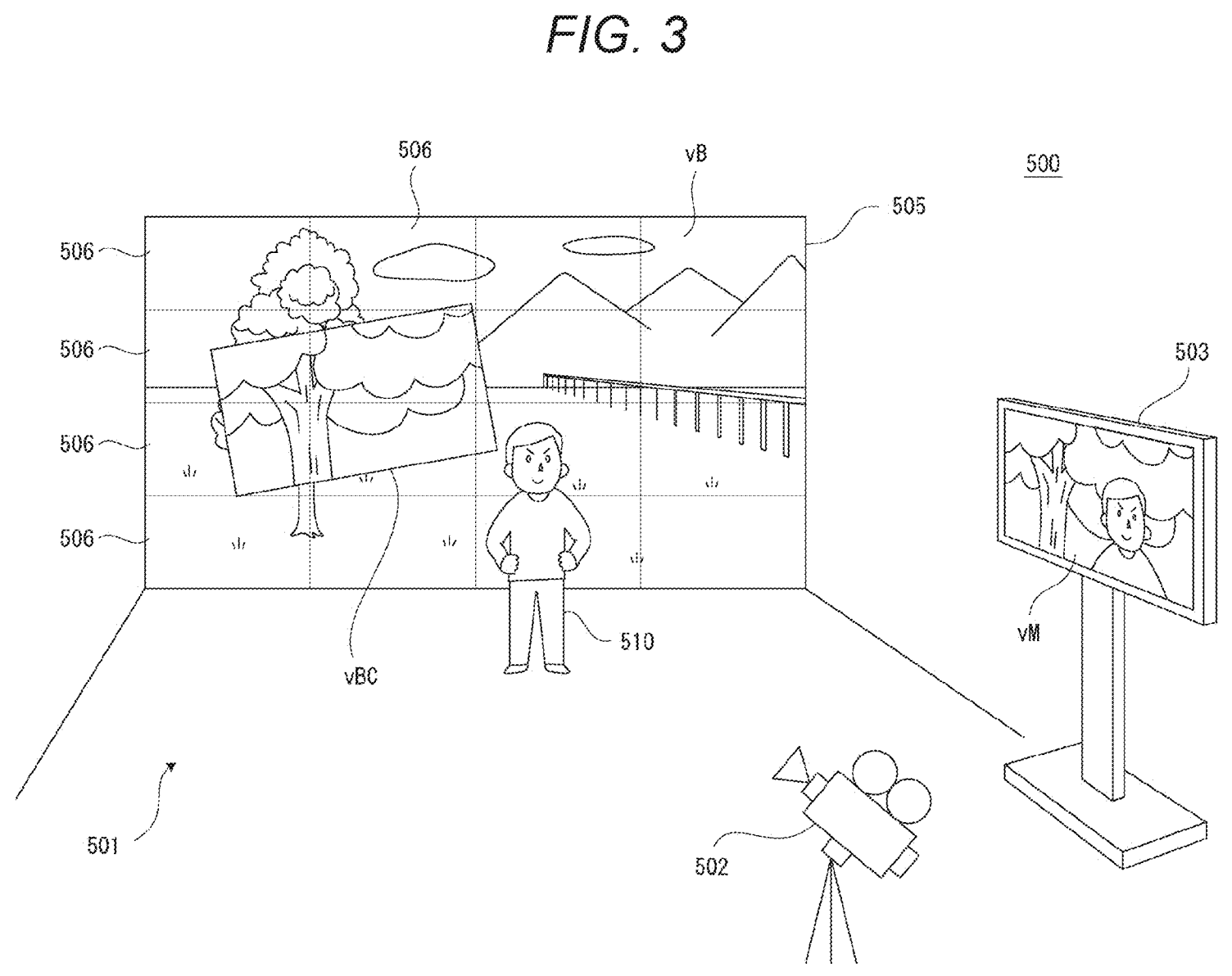

FIG. 2 illustrates a state in which the camera 502 is imaging the performer 510 from a position on the left side of the drawing, and FIG. 3 illustrates a state in which the camera 502 is imaging the performer 510 from a position on the right side of the drawing. In each drawing, a capturing region video vBC is illustrated in the background video vB.

Note that a portion of the background video vB excluding the capturing region video vBC is referred to as an "outer frustum", and the capturing region video vBC is referred to as an "inner frustum".

The background video vB described here indicates the entire video displayed as the background including the capturing region video vBC (inner frustum).

The range of the capturing region video vBC (inner frustum) corresponds to a range actually imaged by the camera 502 in the display surface of the LED wall 505. Then, the capturing region video vBC is a video that is transformed so as to express a scene that is actually viewed when the position of the camera 502 is set as a viewpoint according to the position, the imaging direction, the angle of view, and the like of the camera 502.

Specifically, three dimensions (3D) background data that is a 3D model as a background is prepared, and the capturing region video vBC is sequentially rendered on the basis of the viewpoint position of the camera 502 with respect to the 3D background data in real time.

Note that the range of the capturing region video vBC is actually a range slightly wider than the range imaged by the camera 502 at the time point. This is to prevent the video of the outer frustum from being reflected due to a drawing delay and to avoid the influence of the diffracted light from the video of the outer frustum when the range of imaging is slightly changed by panning, tilting, zooming, or the like of the camera 502.

The video of the capturing region video vBC rendered in real time in this manner is synthesized with the video of the outer frustum. The video of the outer frustum used in the background video vB is rendered in advance on the basis of the 3D background data, and the video is incorporated as the capturing region video vBC rendered in real time into a part of the video of the outer frustum to generate the entire background video vB.

As a result, even when the camera 502 is moved back and forth, or left and right, or a zoom operation is performed, the background of the range imaged together with the performer

510 is captured as a video corresponding to the viewpoint position change accompanying the actual movement of the camera 502.

As illustrated in FIGS. 2 and 3, the monitor video vM including the performer 510 and the background is displayed on the output monitor 503, and this is the captured video. The background of the monitor video vM is the capturing region video vBC. That is, the background included in the captured video is a real-time rendered video.

As described above, in the imaging system 500 of the embodiment, the background video vB including the capturing region video vBC is changed in real time so that not only the background video vB is simply displayed in a planar manner but also a video similar to that in a case of actually imaging on location can be captured.

Note that a processing load of the system is also reduced by rendering only the capturing region video vBC as a range reflected by the camera 502 in real time instead of the entire background video vB displayed on the LED wall 505.

Figure 4:
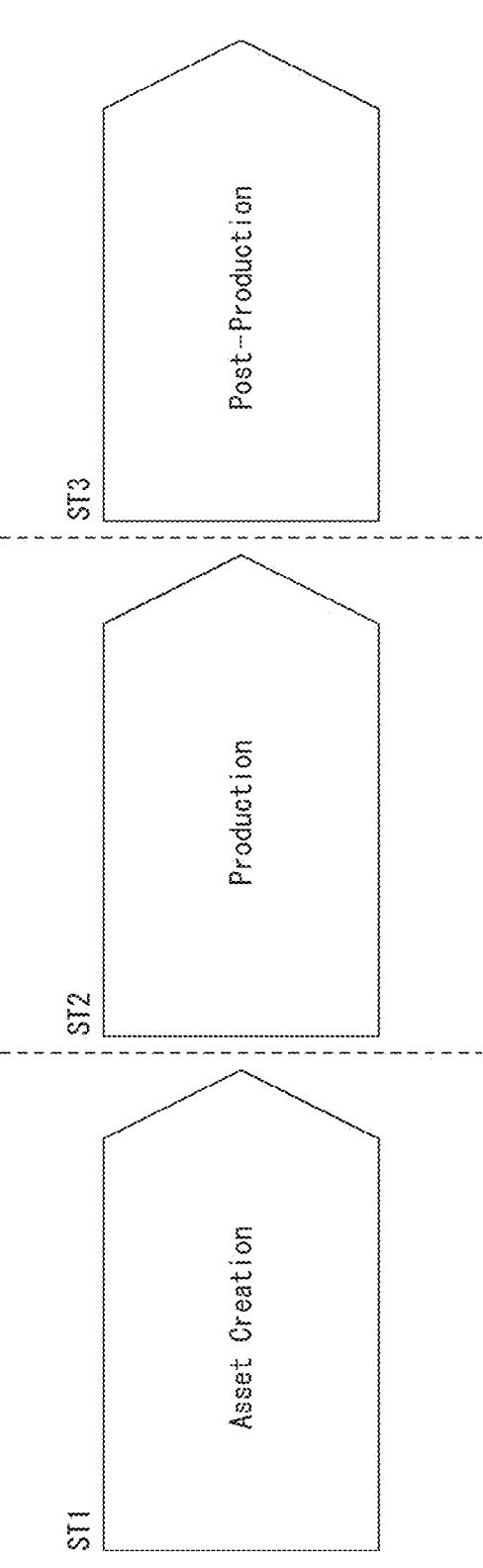
FIG. 4 is an explanatory diagram of a video content producing step of the embodiment.

Here, a producing step for a video content as virtual production in which imaging is performed by the imaging system 500 will be described. As illustrated in FIG. 4, the video content producing step is roughly divided into three stages. The stages are asset creation ST1, production ST2, and post-production ST3.

The asset creation ST1 is a step of producing 3D background data for displaying the background video vB. As described above, the background video vB is generated by performing rendering in real time using the 3D background data at the time of imaging. For this purpose, 3D background data as a 3D model is produced in advance.

Examples of a method of producing the 3D background data include full computer graphics (CG), point cloud data (Point Cloud) scan, and photogrammetry.

The full CG is a method of producing a 3D model with computer graphics. Among the three methods, the full CG requires the most man-hours and time, but is preferably used in a case where an unrealistic video, a video that is difficult to capture in practice, or the like is desired to be the background video vB.

The point cloud data scanning is a method of generating a 3D model based on the point cloud data by performing distance measurement from a certain position using, for example, LiDAR, capturing an image of 360 degrees by a camera from the same position, and placing color data captured by the camera on a point measured by the LiDAR. Compared with the full CG, a 3D model can be produced in a short time. Furthermore, it is easy to produce a 3D model with higher definition than that of the photogrammetry.

The photogrammetry is a photogrammetry technology for analyzing parallax information from two-dimensional images obtained by capturing an object from a plurality of viewpoints to obtain the dimensions and the shape. 3D model production can be performed in a short time.

Note that the point cloud information acquired by the LiDAR may be used in the 3D data generation by photogrammetry.

In the asset creation ST1, for example, a 3D model to be 3D background data is produced using these methods. Of course, the above methods may be used in combination. For example, a part of a 3D model produced by the point cloud data scanning or the photogrammetry is produced by CG and synthesized or the like.

The production ST2 is a step of performing imaging in the imaging studio as illustrated in FIG. 1. Element technologies in this case include real-time rendering, background display, camera tracking, illumination control, and the like.

The real-time rendering is rendering processing for obtaining the capturing region video vBC at each time point (each frame of the background video vB) as described with reference to FIGS. 2 and 3. This is to render the 3D background data produced in the asset creation ST1 from a viewpoint corresponding to the position of the camera 502 or the like at each time point.

In this way, the real-time rendering is performed to generate the background video vB of each frame including the capturing region video vBC, and the background video vB is displayed on the LED wall 505.

The camera tracking is performed to obtain imaging information by the camera 502, and tracks position information, the imaging direction, the angle of view, and the like at each time point of the camera 502. By providing the imaging information including these pieces of information to a rendering engine in association with each frame, real-time rendering according to the viewpoint position or the like of the camera 502 can be executed.

The imaging information is information linked with or associated with a video as metadata.

It is assumed that the imaging information includes position information of the camera 502 at each frame timing, a direction of the camera, an angle of view, a focal length, an F value (aperture value), a shutter speed, lens information, and the like.

The illumination control is to control the state of illumination in the imaging system 500, and specifically, to control the light amount, emission color, illumination direction, and the like of the light 580. For example, the illumination control is performed according to time setting, place setting, and the like of a scene to be imaged.

The post-production ST3 indicates various processing performed after imaging. For example, video correction, video adjustment, clip editing, video effect, and the like are performed.

As the video correction, color gamut conversion, color matching between cameras and materials, and the like may be performed.

As the video adjustment, color adjustment, luminance adjustment, contrast adjustment, and the like may be performed.

As the clip editing, cutting of clips, adjustment of order, adjustment of a time length, and the like may be performed.

As the video effect, a synthesis of a CG video or a special effect video or the like may be performed.

Next, a configuration of the imaging system 500 used in the production ST2 will be described.

Figure 5:
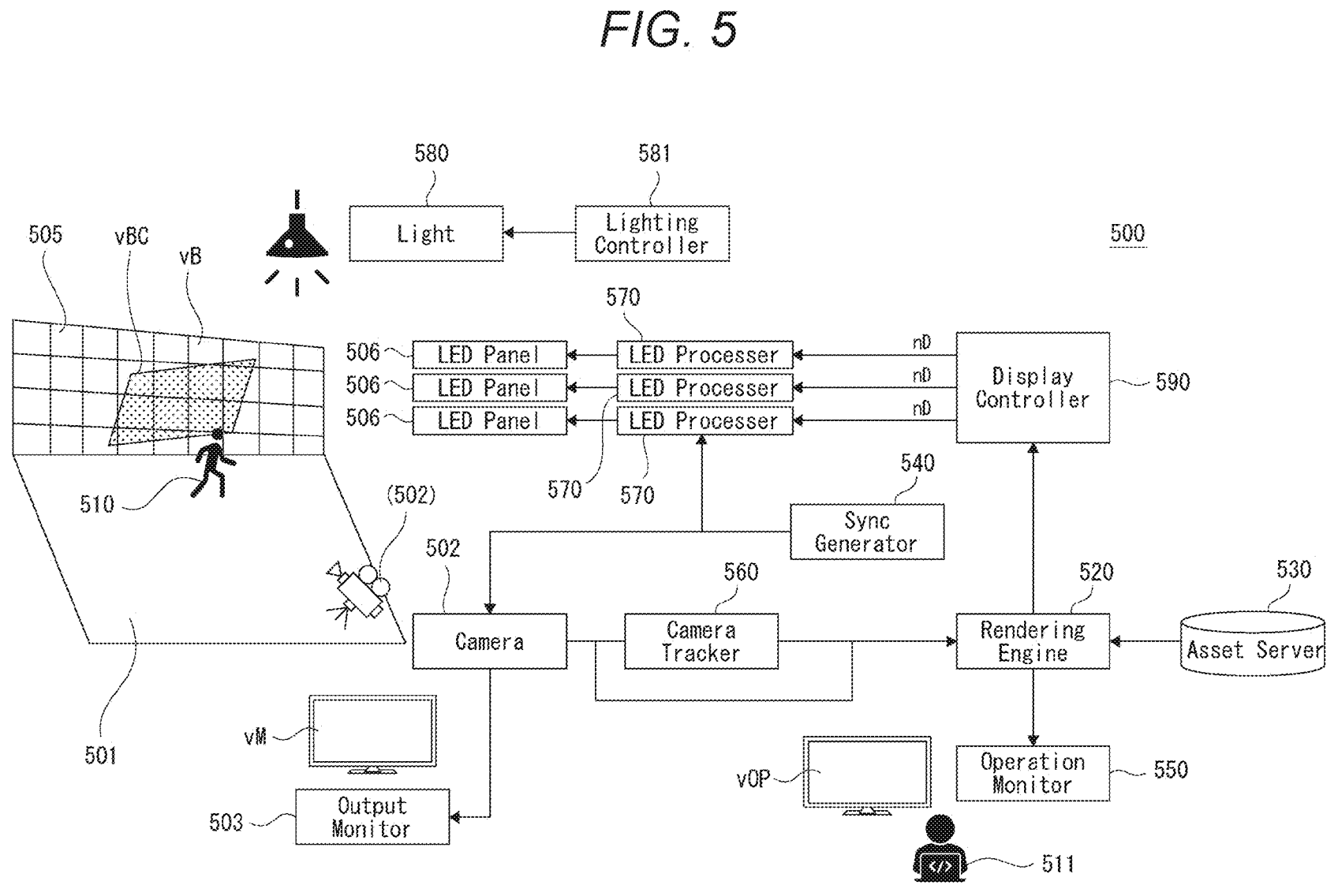

FIG. 5 is a block diagram illustrating a configuration of the imaging system 500 with the outline that has been described with reference to FIGS. 1, 2, and 3.

The imaging system 500 illustrated in FIG. 5 includes the above-described LED wall 505 including the plurality of LED panels 506, the camera 502, the output monitor 503, and the light 580. As illustrated in FIG. 5, the imaging system 500 further includes a rendering engine 520, an asset server 530, a sync generator 540, an operation monitor 550, a camera tracker 560, LED processors 570, a lighting controller 581, and a display controller 590.

Each of the LED processors 570 is provided corresponding to one or the plurality of LED panels 506, and performs video display drive of the corresponding one or the plurality of LED panels 506.

The sync generator 540 generates a synchronization signal for synchronizing frame timings of display videos by the LED panels 506 and a frame timing of imaging by the camera 502, and supplies the synchronization signal to the respective LED processors 570 and the camera 502. However, this does not prevent output from the sync generator 540 from being supplied to the rendering engine 520.

The camera tracker 560 generates imaging information by the camera 502 at each frame timing and supplies the imaging information to the rendering engine 520. For example, the camera tracker 560 detects the position information of the camera 502 relative to the position of the LED wall 505 or a predetermined reference position and the imaging direction of the camera 502 as one piece of the imaging information, and supplies them to the rendering engine 520.

As a specific detection method by the camera tracker 560, there is a method of randomly arranging reflectors on the ceiling and detecting a position from reflected light of infrared light emitted from the camera tracker 560 to the reflectors, the camera tracker 560 being assembled to the camera 502. Furthermore, as a detection method, there is also a method of estimating the self-position of the camera 502 by information of a gyro mounted on the camera platform of the camera 502 or the main body of the camera 502, or image recognition of a video captured by the camera 502.

Furthermore, an angle of view, a focal length, an F value, a shutter speed, lens information, and the like may be supplied from the camera 502 to the rendering engine 520 as the imaging information.

The asset server 530 is a server that can store a 3D model produced in the asset creation ST1, that is, 3D background data on a recording medium and read the 3D model as necessary. That is, the asset server 530 functions as a data base (DB) of 3D background data.

The rendering engine 520 performs processing of generating the background video vB to be displayed on the LED wall 505. For this reason, the rendering engine 520 reads necessary 3D background data from the asset server 530. Then, the rendering engine 520 generates a video of the outer frustum used in the background video vB as a video obtained by rendering the 3D background data in a form of being viewed from spatial coordinates designated in advance.

Furthermore, as processing for each frame, the rendering engine 520 specifies the viewpoint position and the like with respect to the 3D background data using the imaging information supplied from the camera tracker 560 or the camera 502, and renders the capturing region video vBC (inner frustum).

Moreover, the rendering engine 520 synthesizes the outer frustum generated in advance with the capturing region video vBC rendered for each frame to generate the background video vB as the video data of one frame. Then, the rendering engine 520 transmits the generated video data of one frame to the display controller 590.

The display controller 590 generates divided video signals nD obtained by dividing the video data of one frame into video portions to be displayed on the respective LED panels 506, and transmits the divided video signals nD to the respective LED panels 506. At this time, the display controller 590 may perform calibration according to individual differences of color development or the like, manufacturing errors, and the like between display units.

Note that the display controller 590 may not be provided, and the rendering engine 520 may perform these pieces of processing. That is, the rendering engine 520 may generate the divided video signals nD, perform calibration, and transmit the divided video signals nD to the respective LED panels 506.

By the LED processors 570 driving the respective LED panels 506 on the basis of the respective received divided video signals nD, the entire background video vB is displayed on the LED wall 505. The background video vB includes the capturing region video vBC rendered according to the position of the camera 502 or the like at the time point.

The camera 502 can capture performance of the performer 510 including the background video vB displayed on the LED wall 505 in this manner. The video obtained by imaging by the camera 502 is recorded on a recording medium in the camera 502 or an external recording device (not illustrated), and is supplied to the output monitor 503 in real time and displayed as the monitor video vM.

The operation monitor 550 displays an operation image vOP for controlling the rendering engine 520. An engineer 511 can perform necessary settings and operations regarding rendering of the background video vB while viewing the operation image vOP.

The lighting controller 581 controls emission intensity, emission color, irradiation direction, and the like of the light 580. For example, the lighting controller 581 may control the light 580 asynchronously with the rendering engine 520, or may perform control in synchronization with the imaging information and the rendering processing. Therefore, the lighting controller 581 may perform light emission control in accordance with an instruction from the rendering engine 520, a master controller (not illustrated), or the like.

Figure 6:
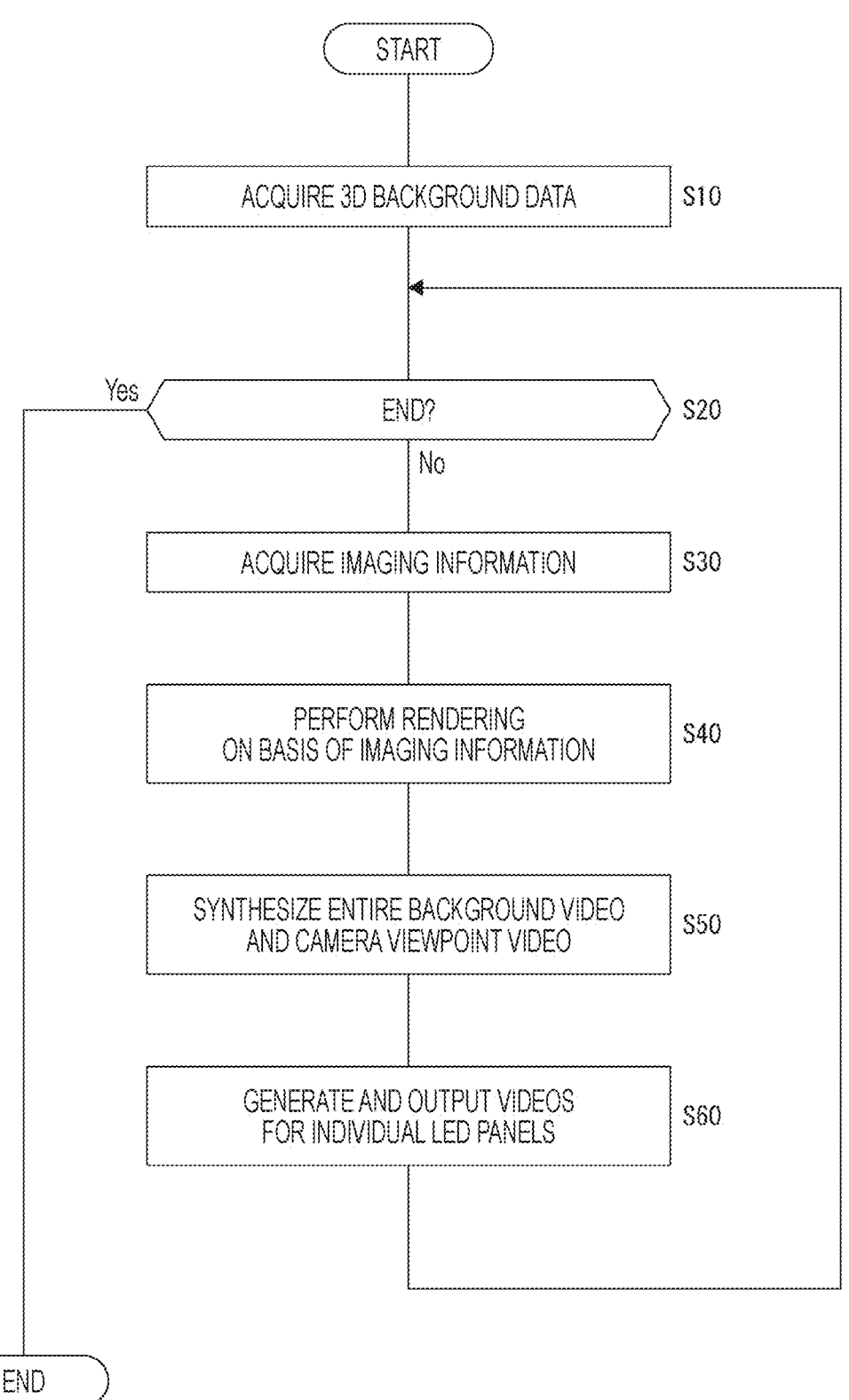
FIG. 6 is a flowchart of background video generation of the imaging system of the embodiment.

FIG. 6 illustrates a process example of the rendering engine 520 in the imaging system 500 having such a configuration.

In step S10, the rendering engine 520 reads the 3D background data to be used this time from the asset server 530, and develops the 3D background data in an internal work area.

Then, a video to be used as the outer frustum is generated.

Thereafter, the rendering engine 520 repeats the processing from step S30 to step S60 at each frame timing of the background video vB until it is determined in step S20 that the display of the background video vB based on the read 3D background data is ended.

In step S30, the rendering engine 520 acquires the imaging information from the camera tracker 560 and the camera 502. As a result, the position and state of the camera 502 to be reflected in the current frame are checked.

In step S40, the rendering engine 520 performs rendering on the basis of the imaging information. That is, the viewpoint position with respect to the 3D background data is specified on the basis of the position, the imaging direction, the angle of view, or the like of the camera 502 to be reflected in the current frame, and rendering is performed. At this time, video processing reflecting the focal length, the F value, the shutter speed, the lens information, and the like can also be performed. By this rendering, video data as the capturing region video vBC can be obtained.

In step S50, the rendering engine 520 performs processing of synthesizing the outer frustum, which is the entire background video, and the video reflecting the viewpoint position of the camera 502, that is, the capturing region video vBC. For example, the processing is to synthesize a video of the entire background rendered at a specific reference viewpoint with a video generated by reflecting the viewpoint of the camera 502. With this processing, the background video vB of one frame displayed on the LED wall 505, that is, the background video vB including the capturing region video vBC is generated.

The processing in step S60 is performed by the rendering engine 520 or the display controller 590. In step S60, the rendering engine 520 or the display controller 590 generates the divided video signals nD obtained by dividing the background video vB of one frame into videos to be displayed on the individual LED panels 506. Calibration may be performed. Then, each divided video signals nD are transmitted to the respective LED processors 570.

By the above processing, the background video vB including the capturing region video vBC captured by the camera 502 is displayed on the LED wall 505 at each frame timing.

Figure 7:
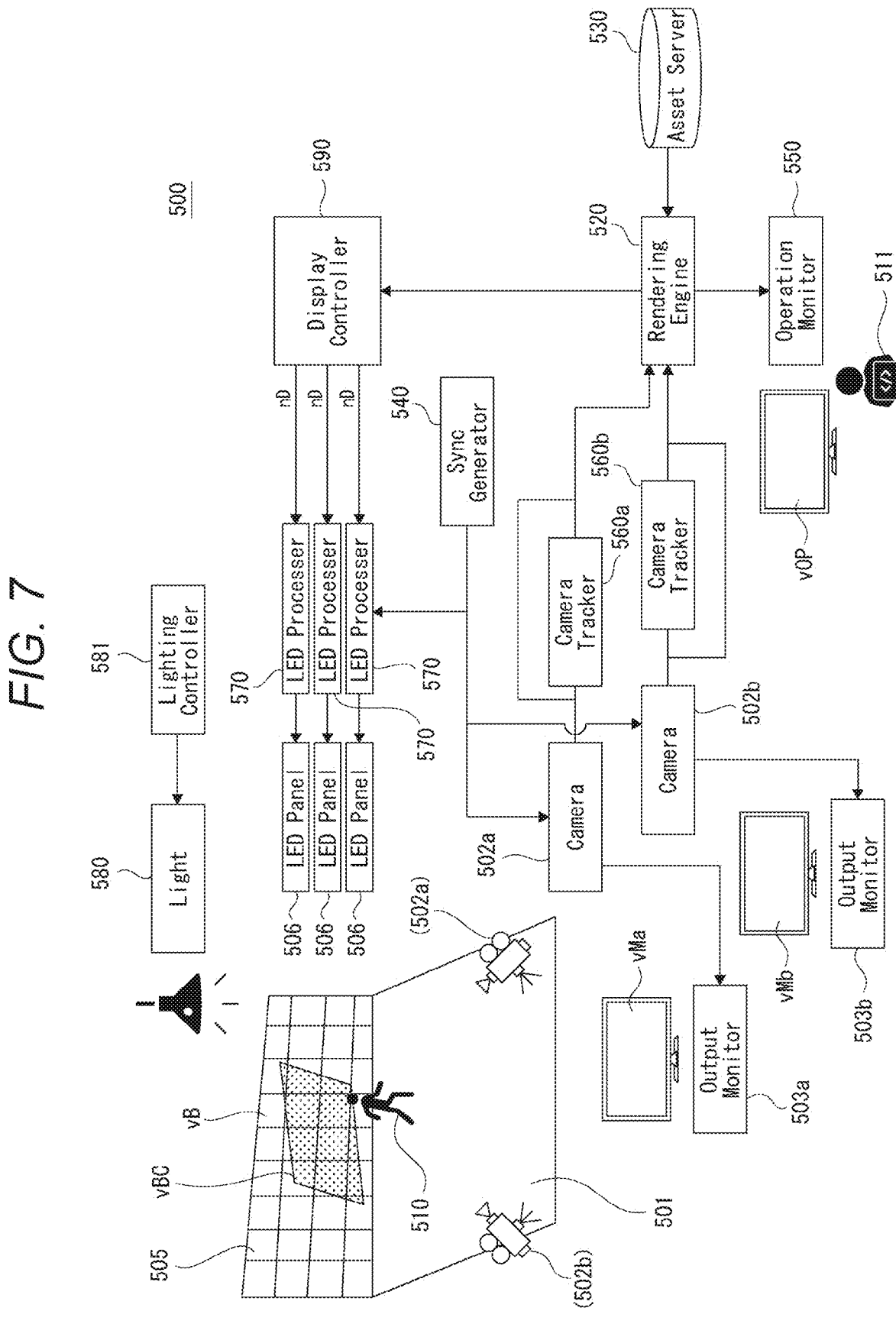
FIG. 7 is a block diagram of the imaging system using a plurality of cameras of the embodiment.

Incidentally, only one camera 502 is illustrated in FIG. 5, but imaging can be performed by a plurality of cameras 502. FIG. 7 illustrates a configuration example in a case where a plurality of cameras 502*a* and 502*b* is used. The cameras 502*a* and 502*b* can independently perform imaging in the performance area 501. Furthermore, synchronization between the cameras 502*a* and 502*b* and the respective LED processors 570 is maintained by the sync generator 540.

Output monitors 503*a* and 503*b* are provided corresponding to the cameras 502*a* and 502*b*, and are configured to display the videos captured by the corresponding cameras 502*a* and 502*b* as monitor videos vMa and vMb, respectively.

Furthermore, camera trackers 560*a* and 560*b* are provided corresponding to the cameras 502*a* and 502*b*, respectively, and detect the positions and imaging directions of the corresponding cameras 502*a* and 502*b*, respectively. The imaging information from the camera 502*a* and the camera tracker 560*a* and the imaging information from the camera 502*b* and the camera tracker 560*b* are transmitted to the rendering engine 520.

The rendering engine 520 can perform rendering to obtain the background video vB of each frame using the imaging information of either the camera 502*a* side or the camera 502*b* side.

Note that although FIG. 7 illustrates an example using the two cameras 502*a* and 502*b*, it is also possible to perform imaging using three or more cameras 502.

However, in a case where the plurality of cameras 502 is used, there is a circumstance that the capturing region video vBC corresponding to each camera 502 interferes. For example, in the example in which the two cameras 502*a* and 502*b* are used as illustrated in FIG. 7, the capturing region video vBC corresponding to the camera 502*a* is illustrated, but in a case where the video of the camera 502*b* is used, the capturing region video vBC corresponding to the camera 502*b* is also necessary. When the capturing region video vBC corresponding to each of the cameras 502*a* and 502*b* is simply displayed, they interfere with each other. Therefore, it is necessary to contrive the display of the capturing region video vBC.

<2. Configuration of Information Processing Device>

Next, a configuration example of an information processing device 70 that can be used in the asset creation ST1, the production ST2, and the post-production ST3 will be described with reference to FIG. 8.

The information processing device 70 is a device capable of performing information processing, particularly video processing, such as a computer device. Specifically, a personal computer, a workstation, a portable terminal device such as a smartphone and a tablet, a video editing device, and the like are assumed as the information processing device 70. Furthermore, the information processing device 70 may be a computer device configured as a server device or an arithmetic device in cloud computing.

In the case of the present embodiment, specifically, the information processing device 70 can function as a 3D model production device that produces a 3D model in the asset creation ST1.

Furthermore, the information processing device 70 can also function as the rendering engine 520 and the asset server 530 constituting the imaging system 500 used in the production ST2.

Furthermore, the information processing device 70 can also function as a video editing device that performs various types of video processing in the post-production ST3.

Furthermore, the information processing device 70 is also used as a switcher 600 described later with reference to FIG. 10 and the like. The switcher 600 includes not only a switching circuit of a signal by hardware but also a function of the information processing device 70 to perform control and calculation.

Figure 8:
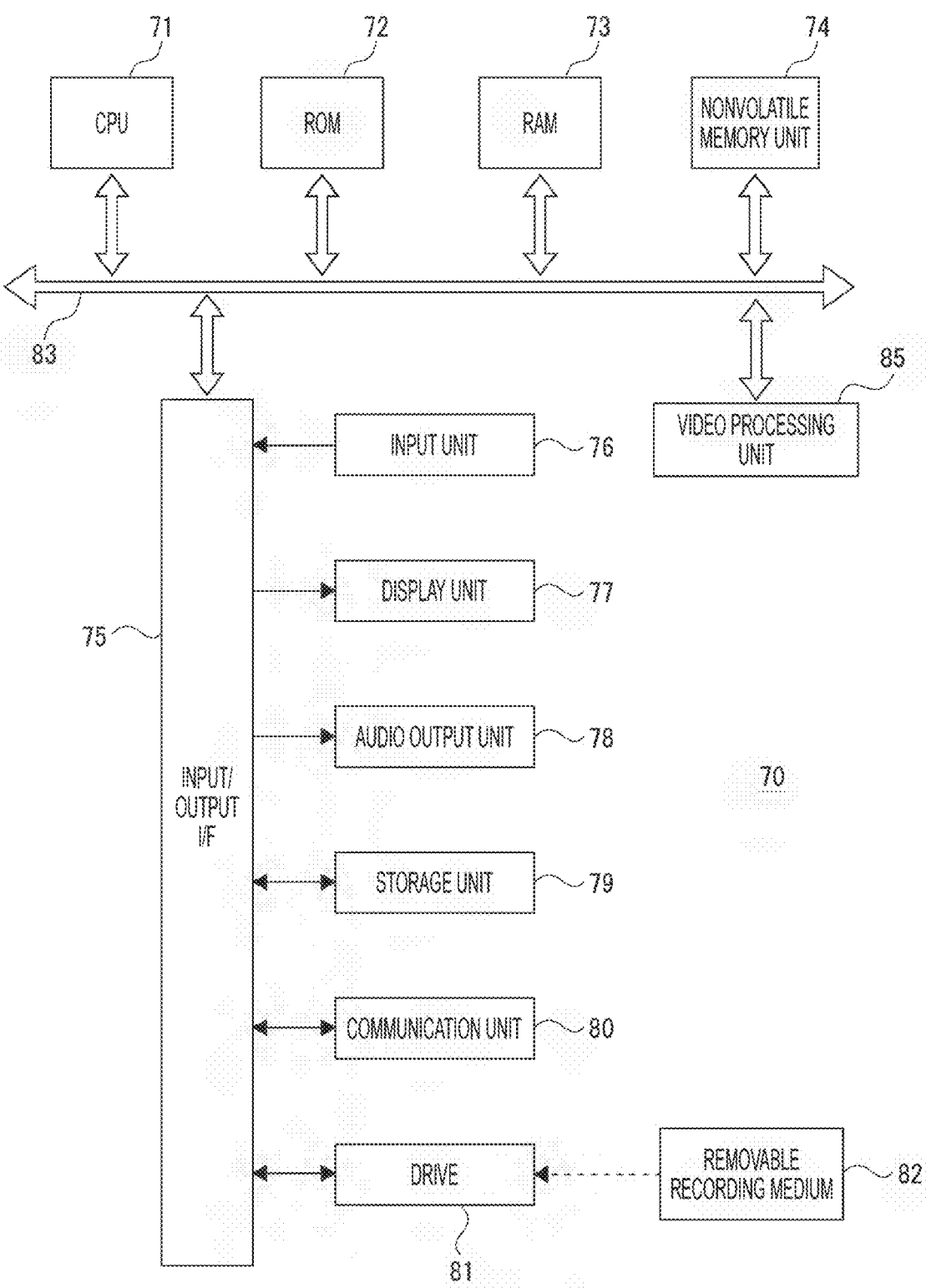
FIG. 8 is a block diagram of an information processing device of the embodiment.

A CPU 71 of the information processing device 70 illustrated in FIG. 8 executes various types of processing in accordance with a program stored in a nonvolatile memory unit 74 such as a ROM 72 or, for example, an electrically erasable programmable read-only memory (EEP-ROM), or a program loaded from a storage unit 79 to a RAM 73. The RAM 73 also appropriately stores data and the like necessary for the CPU 71 to execute various types of processing.

A video processing unit 85 is configured as a processor that performs various types of video processing. For example, the video processing unit 85 is a processor capable of performing any one of 3D model generation processing, rendering, DB processing, video editing processing, video analysis/detection processing, and the like, or a plurality of types of processing.

The video processing unit 85 can be implemented by, for example, a CPU, a graphics processing unit (GPU), general-purpose computing on graphics processing units (GPGPU), an artificial intelligence (AI) processor, or the like that is separate from the CPU 71.

Note that the video processing unit 85 may be provided as a function in the CPU 71.

The CPU 71, the ROM 72, the RAM 73, the nonvolatile memory unit 74, and the video processing unit 85 are connected to one another via a bus 83. An input/output interface 75 is also connected to the bus 83.

An input unit 76 including an operator and an operation device is connected to the input/output interface 75. As the input unit 76, for example, various operation elements and operation devices including a keyboard, a mouse, a key, a dial, a touch panel, a touchpad, a remote controller, and the like are assumed.

A user operation is detected by the input unit 76, and a signal corresponding to the input operation is interpreted by the CPU 71.

A microphone is also assumed as the input unit 76. It is also possible to input voice uttered by the user as operation information.

Furthermore, a display unit 77 including a liquid crystal display (LCD), an organic electro-luminescence (EL) panel, or the like, and an audio output unit 78 including a speaker or the like are integrally or separately connected to the input/output interface 75.

The display unit 77 is a display unit that performs various displays, and includes, for example, a display device provided in the housing of the information processing device 70, a separate display device connected to the information processing device 70, and the like.

The display unit 77 displays various images, operation menus, icons, messages, and the like, that is, displays as a graphical user interface (GUI), on the display screen on the basis of the instruction from the CPU 71.

In some cases, the storage unit 79 including a hard disk drive (HDD), a solid-state memory, or the like or a communication unit 80 is connected to the input/output interface 75.

The storage unit 79 can store various pieces of data and programs. A DB can also be configured in the storage unit 79.

For example, in a case where the information processing device 70 functions as the asset server 530, a DB that stores a 3D background data group can be constructed using the storage unit 79.

The communication unit 80 performs communication processing via a transmission path such as the Internet, wired/wireless communication with various devices such as an external DB, an editing device, and an information processing device, bus communication, and the like.

For example, in a case where the information processing device 70 functions as the rendering engine 520, the communication unit 80 can access the DB as the asset server 530, and receive imaging information from the camera 502 or the camera tracker 560.

Furthermore, also in a case of the information processing device 70 used in the post-production ST3, the communication unit 80 can access the DB as the asset server 530 or the like.

A drive 81 is also connected to the input/output interface 75 as necessary, and a removable recording medium 82 such as a magnetic disk, an optical disk, a magneto-optical disk, a semiconductor memory, or the like is appropriately mounted.

The drive 81 can read video data, various computer programs, and the like from the removable recording medium 82. The read data is stored in the storage unit 79, and video and audio included in the data are output by the display unit 77 and the audio output unit 78. Furthermore, the computer program and the like read from the removable recording medium 82 are installed in the storage unit 79, as necessary.

In the information processing device 70, for example, software for the processing of the present embodiment can be installed via network communication by the communication unit 80 or the removable recording medium 82. Alternatively, the software may be stored in advance in the ROM 72, the storage unit 79, or the like.

<3. Imaging System Using a Plurality of Cameras and Switcher>

In the embodiment, for example, a case where imaging is performed using a plurality of cameras 502 (502*a*, 502*b* . . . ) is assumed as described with reference to FIG. 7.

The captured videos vC of the plurality of systems obtained by capturing the LED wall 505, the performer 510, and the like by the plurality of cameras 502 are selectively switched by the switcher 600 described later, and are output as what is called a main line video. Note that, of course, each of the captured videos vC may be recorded or transmitted separately from the main line video.

Here, a situation occurring in a case where imaging is performed using two or more cameras 502 in virtual production will be described.

As described above, the background video vB captured by the camera 502 is not the entire background video vB displayed on the LED wall 505, but is the range of the capturing region video vBC (hereinafter also referred to as "inner frustum vBC").

Then, the video content of the inner frustum vBC is rendered by the rendering engine 520 according to the position and imaging direction of the camera 502 for each frame, incorporated into the entire body of the background video vB, and displayed on the LED wall 505. Therefore, the range and content of the inner frustum vBC of the background video vB are different according to the camera position and the like for each frame as described with reference to FIGS. 2 and 3. Furthermore, the inner frustum vBC is displayed corresponding to each camera 502.

Figure 9:
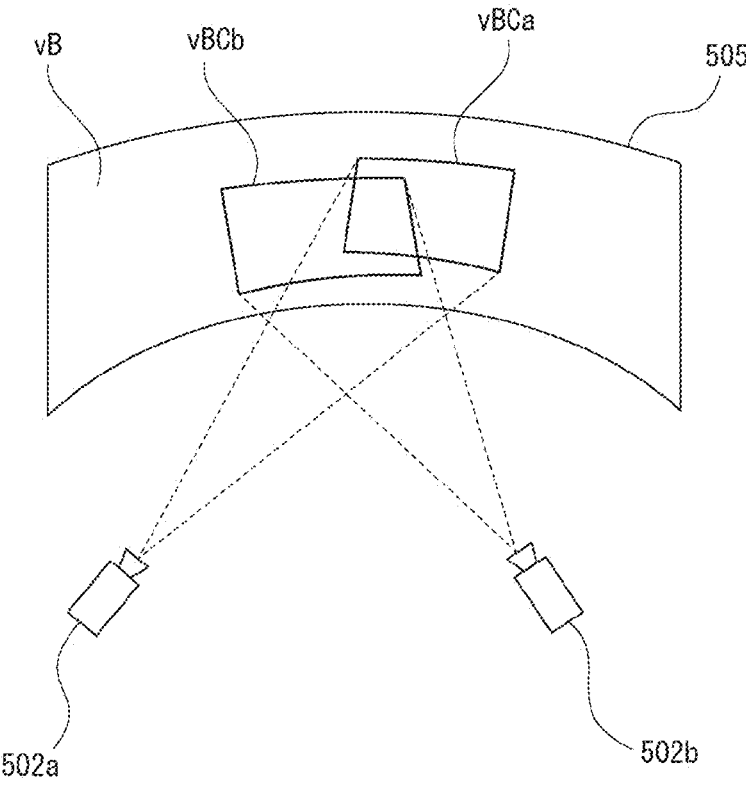
FIG. 9 is an explanatory diagram of overlapping of inner frustums for each camera.

Here, considering that imaging is performed by the two cameras 502a and 502b, the inner frustums vBCa and vBCb corresponding to the respective cameras 502a and 502b are displayed on the LED wall 505. Depending on the positions of the cameras 502a and 502b, the inner frustums vBCa and vBCb may overlap as illustrated in FIG. 9.

If the inner frustums vBCa and vBCb do not overlap, the video vC captured by each of the cameras 502a and 502b is a video including an appropriate background. However, if the inner frustums vBCa and vBCb overlap as illustrated in FIG. 9, the video content of the background of each of the captured videos vC is not in a correct state.

Therefore, a method is considered in which the background video vB for each camera 502 is interleaved in the time axis direction and displayed on the LED wall 505, and the shutter phase/angle is adjusted so that the necessary video can be captured on the camera 502 side to be captured.

For example, in a case where imaging is performed by four cameras 502a, 502b, 502c, and 502d, a background video vB of the camera 502a, a background video vB of the camera 502b, a background video vB of the camera 502c, and a background video vB of the camera 502d are displayed on the LED wall 505 every ¼ of a period of one frame, and each of the cameras 502a, 502b, 502c, and 502d performs exposure in synchronization therewith. For example, the camera 502a performs exposure during a period in which the inner frustum vBC of the camera 502a is displayed.

In this way, inconvenience caused by overlapping of the inner frustums vBC as illustrated in FIG. 9 does not occur.

However, since the video is multiplexed in the time direction, there is a restriction on the number of cameras that can simultaneously capture videos. It is difficult to increase the number of the cameras 502.

Furthermore, various videos are switched on the actual LED wall 505 within the frame period, which is not an environment in which the performer 510 standing in front of the LED wall 505 can easily perform.

Furthermore, since the exposure time is ½ in the case of two cameras and ¼ in the case of four cameras, the exposure amount decreases, the gain of the captured video vC is required to be increased, and noise increases. Alternatively, excessive illumination is required to perform sufficient exposure, and at the same time, it is also necessary to increase the luminance of the LED wall 505.

Therefore, in the present embodiment, in a case where imaging is performed using the plurality of cameras 502, first, basically, the inner frustum vBC for one specific camera 502 is always displayed on the LED wall 505. Specifically, the background video vB including the inner frustum vBC corresponding to the camera 502 serving as the main line video is displayed. When the main line video is switched, the background video vB is also switched accordingly. That is, the background video vB including the inner frustum vBC for the camera 502 after the switching is displayed.

However, in this case, the background video vB of the plurality of systems including the inner frustums vBC of the respective cameras 502 is continuously generated in parallel and selectively displayed on the LED wall 505. That is, the generation of the inner frustum vBC is continued also for the camera 502 that is not served as the main line video. As a result, a video delay caused in a case where rendering corresponding to a new camera 502 is started at the time of switching the main line video is eliminated.

Moreover, when the main line video is switched, the switching timing of the background video vB and the switching timing of the main line video are controlled so that the state in which the video vC captured by a certain camera 502 includes the background video vB of a different camera 502 is not output as the main line video.

Figure 10:
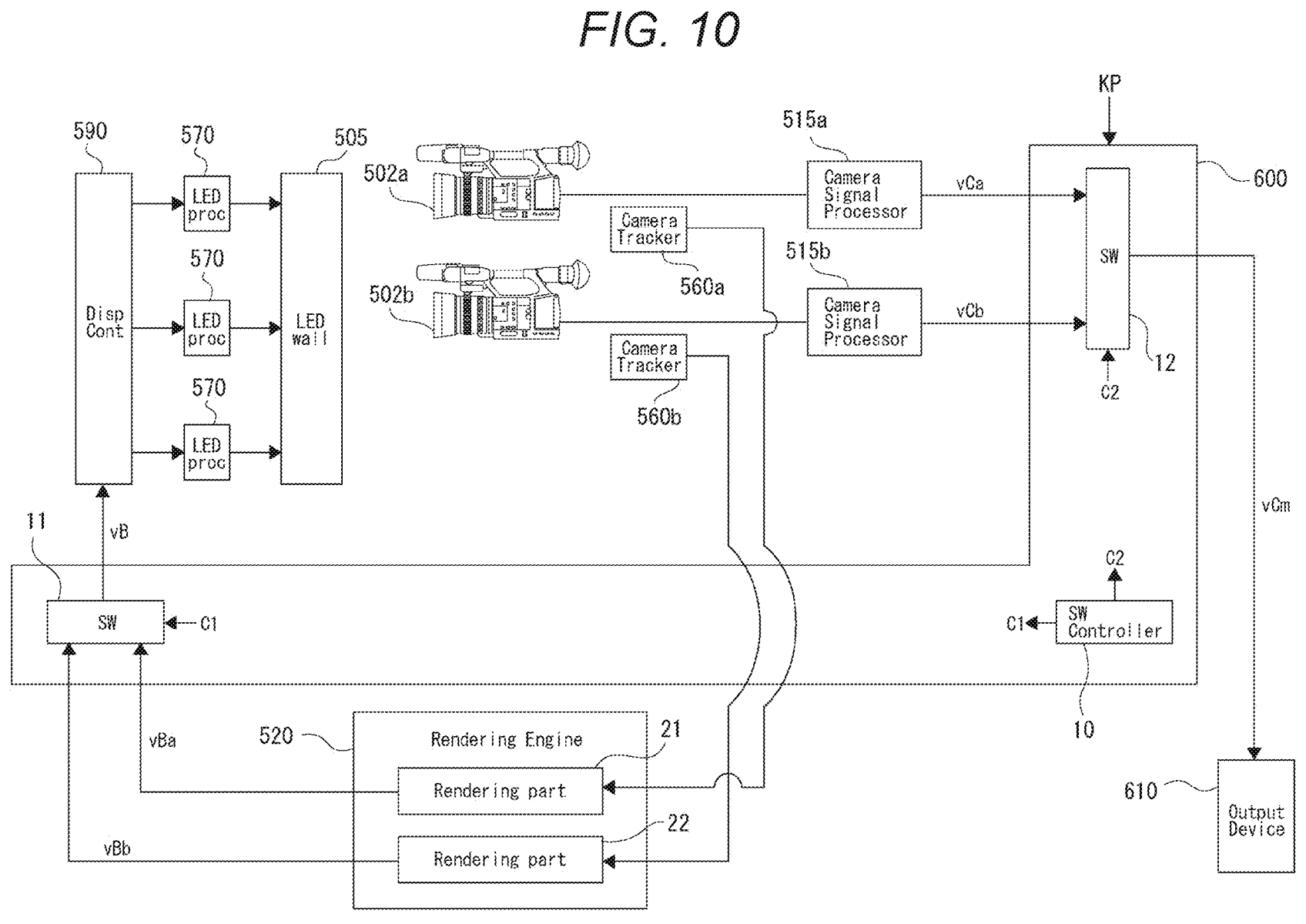

A configuration example for this is illustrated in FIG. 10.

FIG. 10 is obtained by adding the switcher 600 and an output device 610 that switch the captured video vC on the premise of the configuration in FIG. 7. The constituent parts described in FIG. 5 or FIG. 7 are denoted by the same reference numerals, and redundant description is avoided.

For the cameras 502a and 502b, camera signal processing units 515a and 515b that perform signal processing of captured video signals are illustrated. Although omitted in FIGS. 5 and 7, the camera signal processing units 515a and 515b may be formed by a processor or the like in the cameras 502a and 502b, or may be provided as a device of a separate unit from the cameras 502a and 502b.

The video signal captured by the camera 502a is subjected to development processing, resizing processing, and the like by the camera signal processing unit 515a, and is input to the switcher 600 as a captured video vCa. The video signal captured by the camera 502b is subjected to development processing, resizing processing, and the like by the camera signal processing unit 515b, and is input to the switcher 600 as a captured video vCb.

Furthermore, the imaging information including the camera positions, the imaging directions, and the like by the camera trackers 560a and 560b is supplied to the rendering engine 520. Although not illustrated, the angle of view, the focal length, the f-number, the shutter speed, the lens information, and the like of the cameras 502a and 502b are also included in the imaging information and supplied to the rendering engine 520.

The rendering engine 520 includes one or a plurality of information processing devices 70. In this case, the rendering engine 520 is configured to have a plurality of rendering functions as rendering units 21 and 22, and is configured to be able to simultaneously execute rendering corresponding to at least the cameras 502a or 502b.

The rendering unit 21 performs rendering of the inner frustum vBCa corresponding to the camera 502a on the basis of the imaging information regarding the camera 502a, incorporates the inner frustum vBCa into the entire background, and outputs the background video vBa matching the camera 502a.

Furthermore, the rendering unit 22 performs rendering of the inner frustum vBCb corresponding to the camera 502b on the basis of the imaging information regarding the camera 502b, incorporates the inner frustum vBCb into the entire background, and outputs the background video vBb matching the camera 502b.

The switcher 600 is provided with a switch unit 11, and the switch unit 11 receives the background videos vBa and vBb as input, selects one of the background videos vBa and vBb, and outputs the selected video. The background video vBa or vBb selected by the switch unit 11 is the background video vB supplied to the LED wall 505.

As described above with reference to FIGS. 5 and 7, the background video vB is processed by the display controller 590 and distributed to the plurality of LED processors 570, and each LED panel 506 (not illustrated in FIG. 10) constituting the LED wall 505 is driven by the LED processor 570. As a result, the background video vB is displayed on the LED wall 505.

The cameras 502a and 502b capture the background video vB of the LED wall 505 and the performer 510.

As described above, the videos vCa and vCb captured by the cameras 502a and 502b are input to the switcher 600. The switcher 600 is provided with a switch unit 12 for inputting the captured videos vCa and vCb. The switch unit 12 selects one of the captured videos vCa and vCb, and outputs the selected video as a main line video vCm.

The main line video vCm is supplied to the output device 610.

Here, the output device 610 may be a recording device that records the main line video vCm on a recording medium, or may be a video transmission device that broadcasts and transmits the main line video vCm. Furthermore, the output device 610 may be a web server or the like that distributes the main line video vCm.

The switcher 600 includes the switch unit 11, which selects the background video vB, and the switch unit 12, which selects the main line video vCm, as described above, and includes a switcher controller (hereinafter referred to as "SW controller") 10 as a control unit that controls the switch units 11 and 12.

The SW controller 10 can be configured by the information processing device 70 as illustrated in FIG. 8. The SW controller 10 only needs to have a configuration including at least the CPU71, the ROM72, the RAM73, the nonvolatile memory unit 74, and the input/output interface 75 in FIG. 8.

The SW controller 10 performs switching control of the switch units 11 and 12 according to the generation of a switching trigger KP. The SW controller 10 generates a control signal C1 to control switching of the switch unit 11. Furthermore, the SW controller 10 controls switching of the switch unit 12 by the control signal C2.

Note that the switcher 600 is provided with a switcher panel (not illustrated) as an interface device that enables the user to perform various operations and performs various displays for the user, and a controller in the switcher panel may perform switching control of the switch units 11 and 12. That is, the SW controller 10 described below may be processing of the controller in the switcher panel.

The switching trigger KP is, for example, a trigger generated by the switching operation of the main line video vCm by the operator (the switching operation of the camera 502 for the main line video vCm).

Note that not only the operation by the operator but also an automatic switching trigger KP may be generated. For example, it can be assumed that the switching trigger KP is generated by automatic switching control according to a predetermined sequence. Moreover, it can be also assumed that the switching trigger KP is generated by AI control for substituting for the operator.

Figure 11:
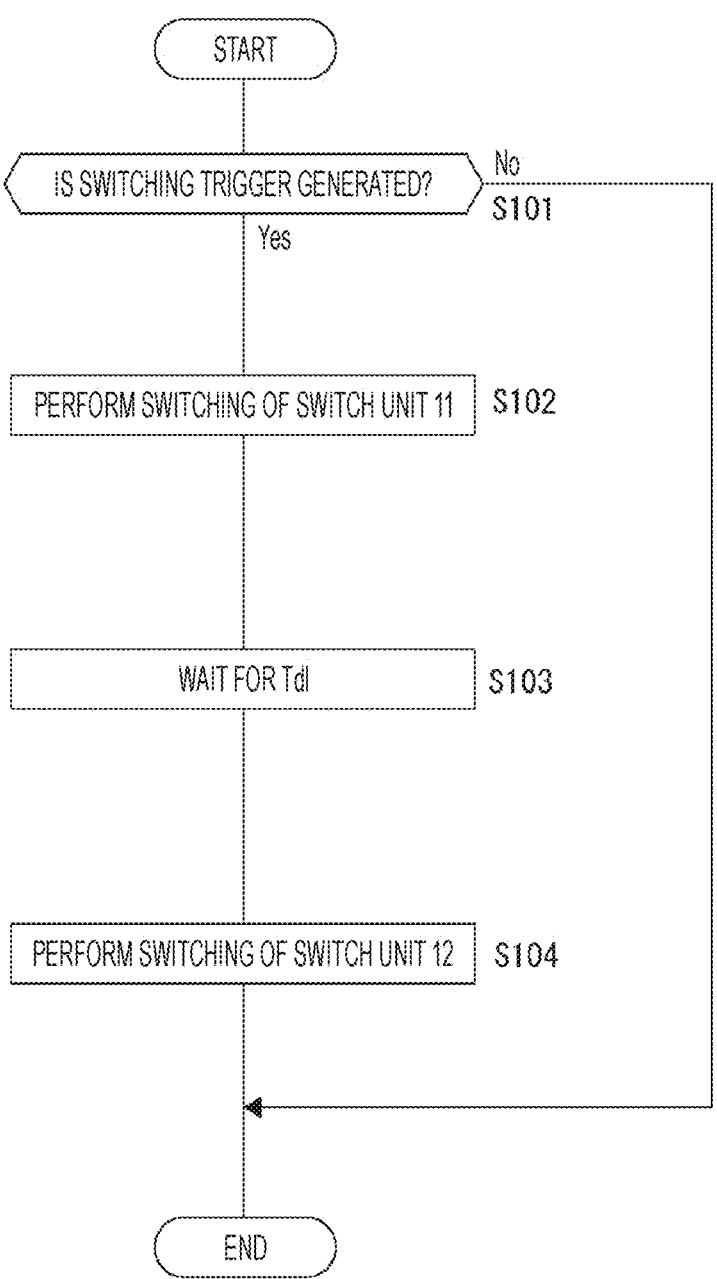
FIG. 11 is a flowchart of switching control by the switcher of the embodiment.

FIG. 11 illustrates the switching control of the switch units 11 and 12 by the SW controller 10.

When the switching trigger KP for the main line video vCm as described above is generated, the SW controller 10 proceeds from step S101 to step S102, and performs switching control of the switch unit 11 by the control signal C1. That is, the switch unit 11 is immediately switched according to the generation of the switching trigger KP.

Subsequently, the SW controller 10 waits for a predetermined time set as a switching delay time Tdl in step S103.

When the time as the switching delay time Tdl elapsed, the SW controller 10 performs the switching control of the switch unit 12 by the control signal C2 in step S104. That is, in a case where the SW controller 10 causes the switch unit 11 to select the background video vBa in step S102, the SW controller 10 causes the switch unit 12 to select the captured video vCa in step S104. Similarly, in a case where the SW controller 10 causes the switch unit 11 to select the background video vBb in step S102, the SW controller 10 causes the switch unit 12 to select the captured video vCb in step S104.

As described above, the SW controller 10 first causes the switch unit 11 to execute switching of in response to the switching trigger KP, and causes the switch unit 12 to execute switching after the switching delay time Tdl elapses.

The switching delay time Tdl will be described.

For example, a case where the selected state is switched from the camera 502a to the camera 502b is assumed.

In this case, the switching delay time Tdl is a time corresponding to a time lag, for example, from when the background video vBb for the camera 502b is selected by the switch unit 11 to when the captured video vCb obtained by capturing the background video vBb by the camera 502b is input to the switch unit 12.

Even if the background video vBa is switched to the background video vBb by the switch unit 11, the display on the LED wall 505 is not switched to the background video vBb at that moment, and there is a delay until the display switching.

That is, as the setting of the operation mode on the LED panel 506 side (hereinafter also referred to as "LED-side operation mode"), there are setting of the frame rate and setting of various types of signal processing performed by the display controller 590 and the LED processor 570, so that a delay time until display switching occurs according to these LED-side operation modes. In terms of the signal processing, for example, the delay time from the switching of the switch unit 12 to the switching of the display differs depending on the resizing processing of the video according to the LED wall 505 (LED panel 506) side or the like.

Furthermore, the setting of the operation mode related to imaging by the camera is also related to the time lag. The operation mode related to imaging by the camera is an operation mode in the camera 502 or the camera signal processing unit 515. Hereinafter, the operation mode related to imaging by the camera is also referred to as a "camera-side operation mode". For example, a delay occurs due to a frame rate, a shutter speed, a reading region from the image sensor, processing contents of the camera signal processing unit 515, and the like as settings of the camera 502.

Figure 12:
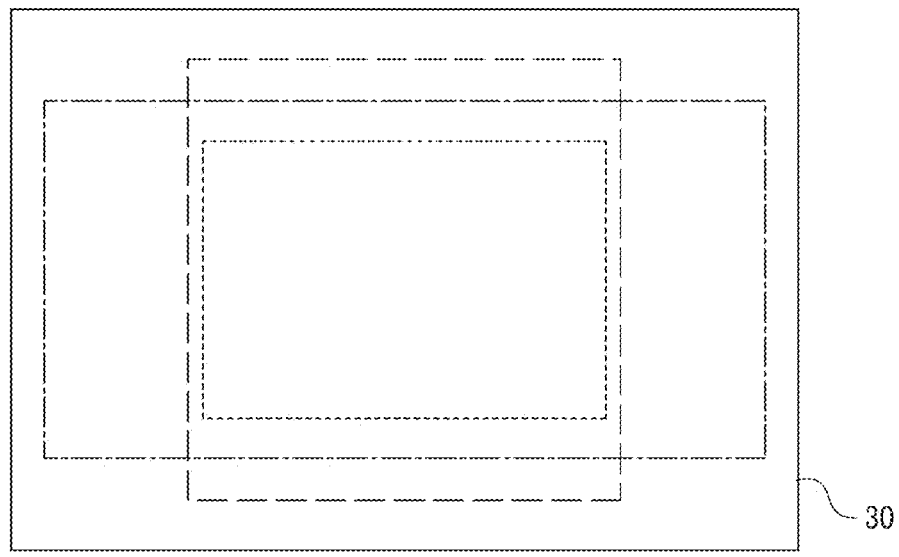
FIG. 12 is an explanatory diagram of an example of processing affecting a switching delay time.

For example, FIG. 12 illustrates an example of a reading range from an image sensor 30. It is assumed that a solid line indicates the entire pixel region of the image sensor 30. Reading of a photoelectric conversion signal to be an imaging signal from the image sensor 30 may be performed in the entire pixel region indicated by a solid line in some cases, or may be performed in various cases according to a reading mode, such as a range indicated by a dotted line, a range indicated by a broken line, and a range indicated by an alternate long and short dash line. The delay time varies according to the difference between these reading ranges. Furthermore, there is also a delay due to signal processing or resizing processing on the captured video vC.

By these camera-side operation modes, a time lag occurs from when the background video vBb displayed on the LED wall 505 is captured (exposed) by the camera 502b until the captured video vCb is input to the switch unit 12.

Therefore, the switching delay time Tdl is set according to the LED-side operation mode and the camera-side operation mode. As a result, in a case where the background video vBa is switched to the background video vBb for the camera 502b by the switch unit 11, for example, the switch unit 12 is switched at the timing when the captured video vCb obtained by capturing the background video vBb by the camera 502b is input to the switch unit 12, and the main line video vCm can be set to the video vCb captured by the camera 502b.

If the switching timing of the switch unit 12 is early, the captured video vCb captured by the camera 502b at the time when the background video vBa is displayed becomes the main line video vCm. This means that the video with the incorrect background is included in the main line video vCm. In order to avoid this, an appropriate switching delay time Tdl is set, and the switching timing is controlled as illustrated in FIG. 11.

A specific example of the setting processing of the switching delay time Tdl will be described later.

With the above processing, it is possible to switch the camera 502 used for capturing the main line video vCm in the shortest time. In particular, during imaging, rendering of the background videos vBa and vBb is always executed by the rendering units 21 and 22, so that the background video vB of the switching destination can be immediately output from the switch unit 11 at the time of generation of the switching trigger KP. That is, there is no rendering delay.

Then, by switching the switch unit 12 at the timing when the background video vB after the switching is input to the switch unit 12, the main line video vCm does not become a video with incorrect background.

In FIG. 10, the case where imaging is performed by the two cameras 502a and 502b is exemplified, but when imaging is performed by three or more cameras 502, the process in FIG. 11 is similarly performed, so that a video with appropriate background can be set as the main line video vCm.

Figure 13:
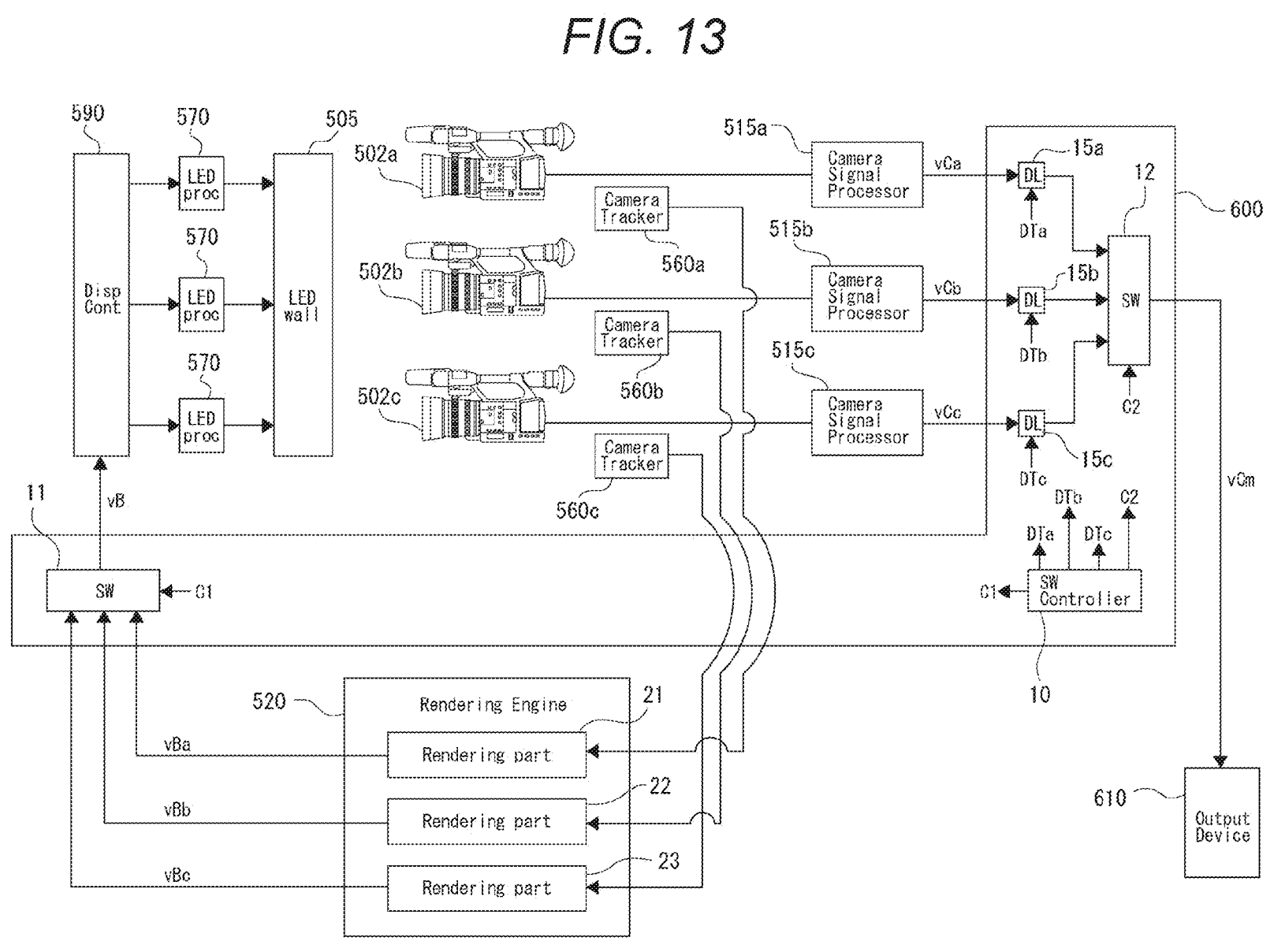

FIG. 13 illustrates a case where imaging is performed by the three cameras 502a, 502b, and 502c. In this case, the videos vCa, vCb, and vCc captured by the respective cameras 502 are input to the switch unit 12.

In response to imaging by the three cameras 502a, 502b, and 502c, in the rendering engine 520, the background videos vBa, vBb, and vBc are generated by the corresponding rendering units 21, 22, and 23, respectively, and are selected by the switch unit 11.

Also in this case, in a case where the switch unit 11 is switched in the process in FIG. 11, the SW controller 10 causes the switch unit 12 to execute switching after the switching delay time Tdl elapses.

In a case where the SW controller 10 causes the switch unit 11 to select the background video vBa in step S102, the SW controller 10 causes the switch unit 12 to select the captured video vCa in step S104. Similarly, in a case where the SW controller 10 causes the switch unit 11 to select the background video vBb in step S102, the SW controller 10 causes the switch unit 12 to select the captured video vCb in step S104. Similarly, in a case where the SW controller 10 causes the switch unit 11 to select the background video vBc in step S102, the SW controller 10 causes the switch unit 12 to select the captured video vCc in step S104.

In this manner, in step S104, the SW controller 10 performs control to cause the switch unit 12 to execute switching to the video vC captured by the camera 502 corresponding to the background video vB after the switching by the switch unit 11.

Note that, in FIG. 13, delay buffers 15a, 15b, and 15c are illustrated in the switcher 600. In a case where the delay time due to the camera-side operation mode is not different among the cameras 502a, 502b, and 502c, for example, in a case where the cameras 502a, 502b, and 502c are of the same model, the delay buffers 15a, 15b, and 15c are usually unnecessary. However, in a case where the models of the plurality of cameras 502 are different, or even in the same model, the delay times of the plurality of cameras 502 may be different for some reasons. Therefore, the delay buffers 15a, 15b, and 15c are provided to make the delay times of the captured videos vCa, vCb, and vCc captured by the respective cameras 502 uniform, and the captured videos vCa, vCb, and vCc are input to the switch unit 12.

The delay buffers 15a, 15b, and 15c provide buffer delay times DTa, DTb, and DTc for the captured videos vCa, vCb, and vCc, respectively.

This is to adjust the delay times of the captured videos vCa, vCb, and vCc so as to match the one having the longest delay time among the captured videos vCa, vCb, and vCc.

It is assumed that t1, t2, and t3 are times from the input (exposure) of light to the image sensor to the input to the switch unit 12 of the captured videos vCa, vCb, and vCc, respectively. Then, it is assumed that the time t3 is the longest. In this case, the buffer delay times DTa, DTb, and DTc of the delay buffers 15a, 15b, and 15c are, for example, $$DTa = t3 - t1$$
$$DTb = t3 - t2$$
$$DTc = t3 - t3 = 0$$

and the like.

Alternatively, if the shortest buffer delay time DBT exists in the delay buffers 15a, 15b, and 15c, the buffer delay times DTa, DTb, and DTc are $$DTa = t3 - t1 + DBT$$
$$DTb = t3 - t2 + DBT$$
$$DTc = t3 - t3 + DBT = DBT.$$

By providing these buffer delay times, the time until the input of the captured videos vCa, vCb, and vCc to the switch unit 12 is made uniform. Then, by setting the switching delay time Tdl described above on the basis of the uniformized time, it is possible to output the main line video vCm with the correct background from the switching time point of the switch unit 12.

Note that, although, in FIGS. 10 and 13, the switch units 11 and 12 are configured in one switcher 600, a switcher having the switch unit 11 and a switcher having the switch unit 12 may be separate devices. In any configuration, the SW controller 10 provided in any switcher or in a separate device only needs to be able to control the switching timing of the switch units 11 and 12 by performing the control in FIG. 11.

<4. Delay Time Setting Process>

The setting of the switching delay time Tdl will be described.

First, it is conceivable that the SW controller 10 stores the switching delay time Tdl as a fixed value. As described above, the switching delay time Tdl is determined by the LED-side operation mode and the camera-side operation mode, but the LED-side operation mode and the camera-side operation mode are normally not changed during imaging. Furthermore, there may be an imaging system 500 in which the same setting is always set as the system setting.

In such a case, it is only necessary to calculate the time lag in the state of the fixed operation mode, set the switching delay time Tdl accordingly, and store the switching delay time Tdl in advance in the internal memory of the SW controller 10 or the like.

Regardless of whether the switching delay time Tdl is a fixed value or not, the operator may input a value of the switching delay time Tdl and store the value in the internal memory of the SW controller 10 or the like. In the case of the fixed value, the operator sets the switching delay time Tdl as initial setting or the like, and inputs the switching delay time Tdl at the preparation stage before imaging.

In the imaging system 500 capable of changing the LED-side operation mode or the camera-side operation mode, in a case where the operation mode setting is changed, the operator sets an appropriate switching delay time Tdl and inputs the switching delay time Tdl at the preparation stage before imaging.

By making the operator know the delay value corresponding to various LED-side operation modes and camera-side operation modes, it is possible to input an appropriate delay value according to the mode change.

Alternatively, it is also conceivable that the operator inputs information of the LED-side operation mode or the camera-side operation mode to be set at the preparation stage of imaging. For example, the SW controller 10 can acquire the delay time by inputting the current operation mode by storing the information of the delay time according to the operation mode as table data or the like, and thereby can calculate the switching delay time Tdl.

Hereinafter, as still another method, a process example in which the SW controller 10 automatically calculates the switching delay time Tdl will be described.

First, as a premise, it is assumed that a delay management table for managing a delay time corresponding to various operation modes is registered in advance in the switcher 600. For example, the delay management table is stored in a memory in the SW controller 10 or a memory provided separately from the SW controller 10 in the switcher 600.

Then, it is assumed that the SW controller 10 can inquire of the display controller 590, the LED processor 570, and the LED panel 506 about model information and various setting values. Similarly, it is assumed that the SW controller 10 can inquire each camera 502 and the camera signal processing unit 515 about model information and various setting values.

Figure 14:
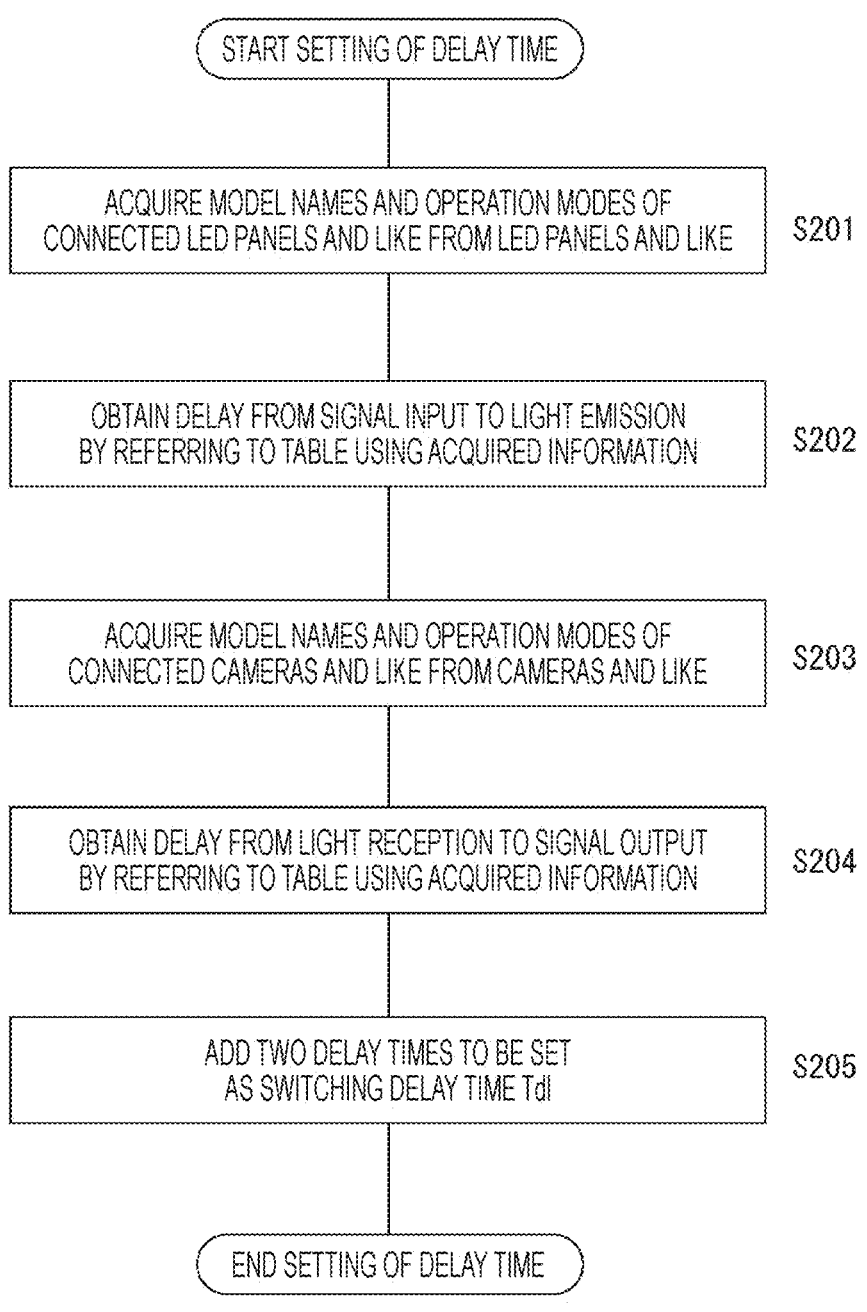
FIG. 14 is a flowchart of a first setting process example of a switching delay time applicable in the embodiment.

On the premise of such a configuration, the SW controller 10 performs the process in FIG. 14 at the time of preparing for imaging.

In step S201, the SW controller 10 acquires information of the model names and the operation modes of the LED panels and the like connected thereto (the display controller 590, the LED processor 570, the LED panel 506) by communication with these LED panels and the like connected thereto.

In step S202, the SW controller 10 obtains the delay time from the signal input to the light emission of the background video vB by referring to the delay management table using the information acquired from the LED panel or the like.

In step S203, the SW controller 10 acquires information of the model names and the operation modes of the connected cameras and the like (the camera 502, the camera signal processing unit 515) by communication with these cameras and the like.

In step S204, the SW controller 10 obtains the delay time from the light reception to the output of the signal of the captured video vC to the switch unit 12 by referring to the delay management table using the information acquired from the camera or the like.

In step S205, the SW controller 10 adds the respective delay times obtained in steps S202 and S204 to set the switching delay time Tdl.

The switching delay time Tdl is automatically set by the above process, and is used as the switching delay time Tdl in step S103 in FIG. 11 during the subsequent imaging.

In the process in FIG. 14, information of a model name and an operation mode is acquired from an LED panel or the like, a camera or the like and the delay time is calculated, but there is also an example of measuring an actual delay time as another method.

Figure 15:
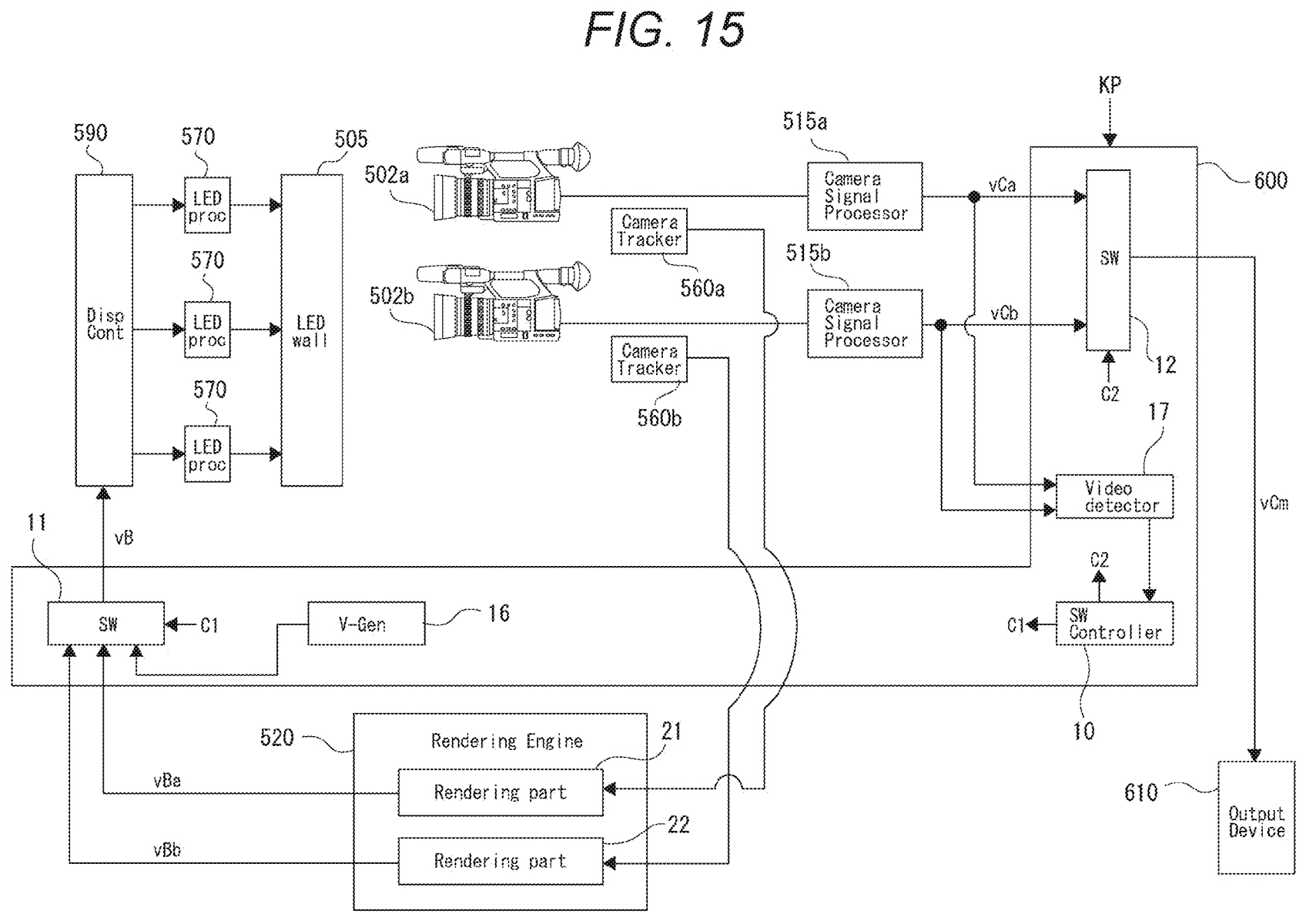

For example, the configuration illustrated in FIG. 15 is adopted. In the example in FIG. 15, the switcher 600 is provided with a video generator 16 and a video detector 17.

The video generator 16 can input a video signal for displaying a specific measurement video to the switch unit 11. The switch unit 11 selects and outputs the background videos vBa and vBb and the measurement video. Note that the video generator 16 only needs to output a specific measurement video, and only needs to be actually configured by a frame memory that stores a video signal as the measurement video.

The video detector 17 receives outputs of the camera signal processing units 515a and 515b, that is, the captured videos vCa and vCb, which are video signals input to the switch unit 12, as input, and detects the video contents. Specifically, the video detector 17 only needs to be able to detect at least whether or not the captured videos vCa and vCb are the measurement videos.

In this manner, the switcher 600 can output the measurement video, and can detect whether or not the input captured video vC is the measurement video.

Figure 16:
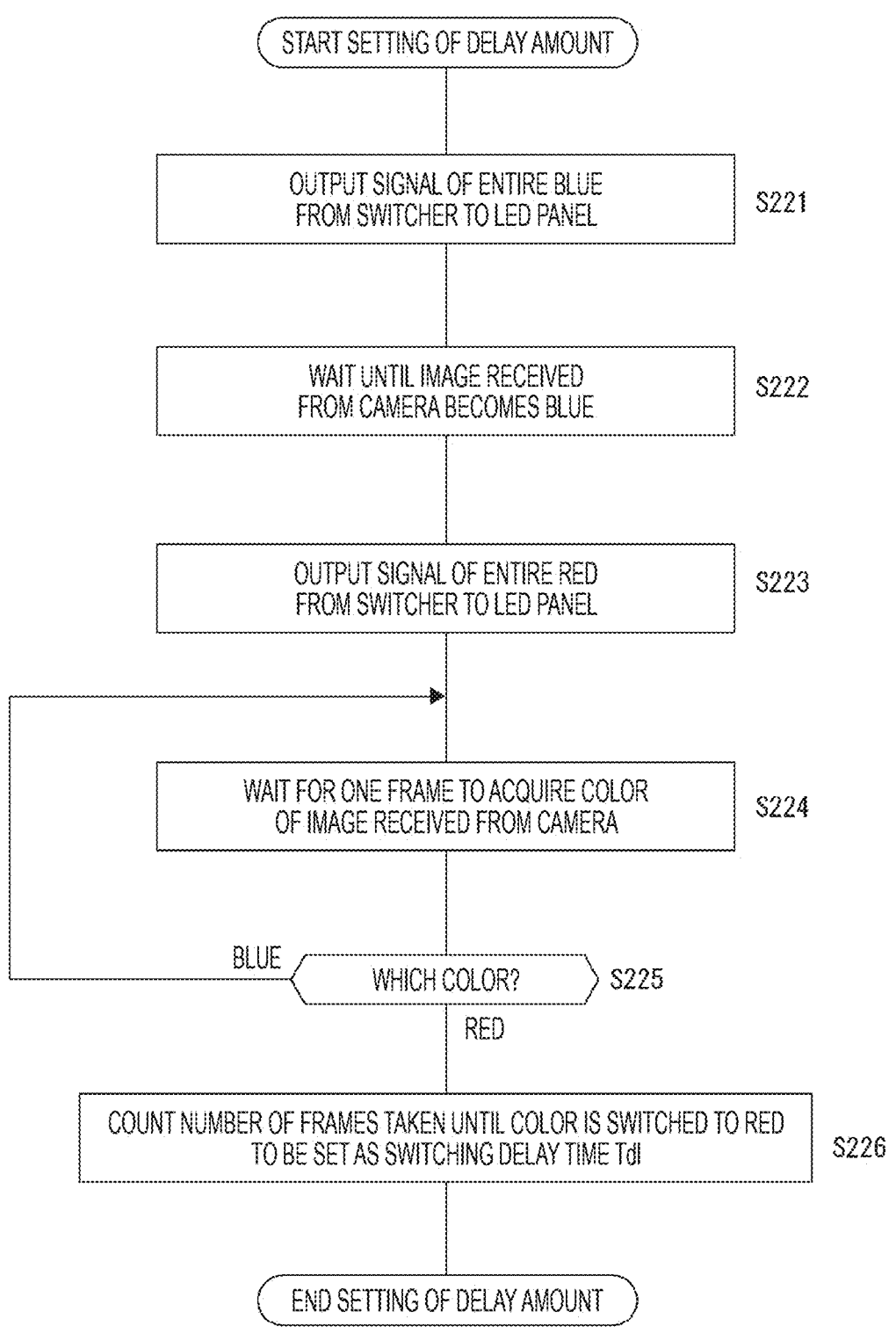
FIG. 16 is a flowchart of a second setting process example of a switching delay time applicable in the embodiment.

Then, the SW controller 10 performs the process in FIG. 16, for example, at the time of preparing for imaging.

In step S221, the SW controller 10 causes the LED panel 506 to display the measurement video, for example, as the entire blue. That is, the SW controller 10 causes the video generator 16 to output the measurement video of the entire blue, and causes the switch unit 11 to select the measurement video.

In step S222, the SW controller 10 waits until the input captured video vC becomes the entire blue video. That is, the SW controller 10 waits for the timing at which the video detector 17 detects the captured video vC of the entire blue.

When the video detector 17 detects the captured video vC of the entire blue, the SW controller 10 causes the LED panel 506 to display the measurement video as, for example, the entire red in step S223. That is, the SW controller 10 causes the video generator 16 to output the measurement video of the entire red. The SW controller 10 causes the switch unit 11 to continue the selected state of the measurement video from the video generator 16.

In step S224, the SW controller 10 waits for one frame period to acquire information on the color of the screen detected by the video detector 17, and checks whether the color is blue or red in step S225.

When the color is blue, the SW controller 10 waits for one frame period again, and checks information on the color of the screen detected by the video detector 17.

When the color is red, the SW controller 10 proceeds to step S226, counts the number of frames until the color is switched from blue to red, and sets the switching delay time Tdl accordingly. For example, in a case where a period of three frames is required for the color being switched from blue to red, the switching delay time Tdl is a time corresponding to three frames.

The switching delay time Tdl is automatically set by the above process, and is used as the switching delay time Tdl in step S103 in FIG. 11 during the subsequent imaging.

In this process, by actually measuring the delay time, it is possible to automatically set the accurate switching delay time Tdl without having the delay management table in the case of FIG. 14 described above.

Note that the above description is based on the premise of the case where the delay times of the plurality of cameras 502 are the same. In this case, the video detector 17 may detect the color of the captured video vC of any camera 502.

Figure 17:
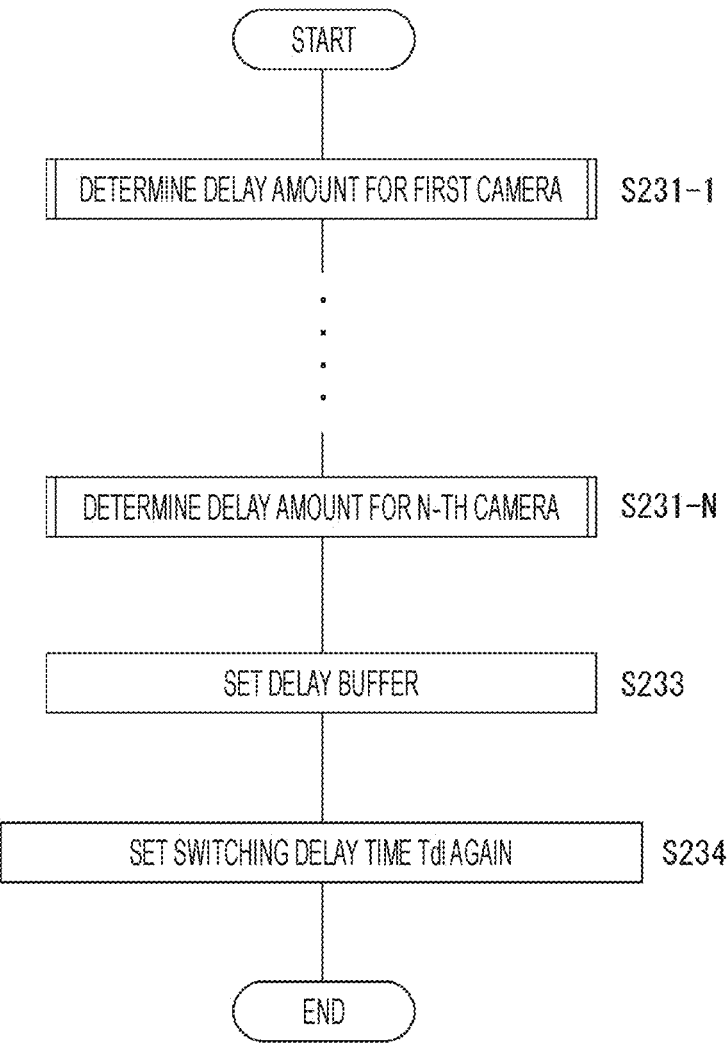
FIG. 17 is a flowchart of a third setting process example of a switching delay time applicable in the embodiment.

FIG. 17 illustrates an example of a case where the delay buffers 15a, 15b, and 15c are provided as illustrated in FIG. 13 on the assumption that the delay times of the plurality of cameras 502 are different from each other.

In step S231-1 in FIG. 17, the SW controller 10 performs the processing from step S221 to step S226 in FIG. 16 on the first camera 502. For example, for the camera 502a as a target, the captured video vCa captured is checked by the video detector 17, the number of frames is counted, and the switching delay time Tdl for the camera 502a is calculated.

Such processing is also performed on the other cameras 502b and 502c.

Step S231-N indicates that the process in FIG. 16 is similarly performed on the last camera 502 (for example, the camera 502c in the case of three cameras).

At the time of imaging using N cameras, N switching delay times Tdl are calculated by performing the process in FIG. 16 for each of the N cameras.

In step S233, the SW controller 10 sets the delay buffer 15. In a case where the three cameras 502a, 502b, and 502c are considered, the buffer delay times DTa, DTb, and DTc of the respective delay buffers 15a, 15b, and 15c are set.

As described above, the buffer delay times DTa, DTb, and DTc are set so as to match the delay times from the other cameras 502 with the camera 502 having the longest delay time.

In step S234, the SW controller 10 determines the switching delay time Tdl used in the process in FIG. 11 in consideration of the buffer delay times DTa, DTb, and DTC.

For example, a value obtained by adding the buffer delay time for the camera 502 to the maximum switching delay time Tdl among the switching delay times Tdl obtained in steps S231-1 to S231-N is set as the switching delay time Tdl to be used.

For example, in a case where the delay time of the camera 502c is the longest, the switching delay time Tdl to be determined is a value obtained by adding the buffer delay time DTc to the switching delay time Tdl measured for the camera 502c. For example, if the shortest buffer delay time DTc=DBT, the switching delay time Tdl+DBT measured for the camera 502c is determined to be the switching delay time Tdl to be used. At this time, if the shortest buffer delay time DBT=0, the switching delay time Tdl measured for the camera 502c is determined to be the switching delay time Tdl to be used.

As described above, in a case where the delay time difference between the cameras is adjusted using the delay buffer, the switching delay time Tdl is set by reflecting the buffer delay time.

Alternatively, if the buffer delay time DT=0 for the camera 502 having the maximum delay time, the switching delay time Tdl measured for the camera 502 having the maximum delay time is determined to be the switching delay time Tdl to be used.

<5. Shutter System>

Meanwhile, in the case of the present embodiment, each camera 502 performs exposure/reading by a global shutter system.

Figure 18:
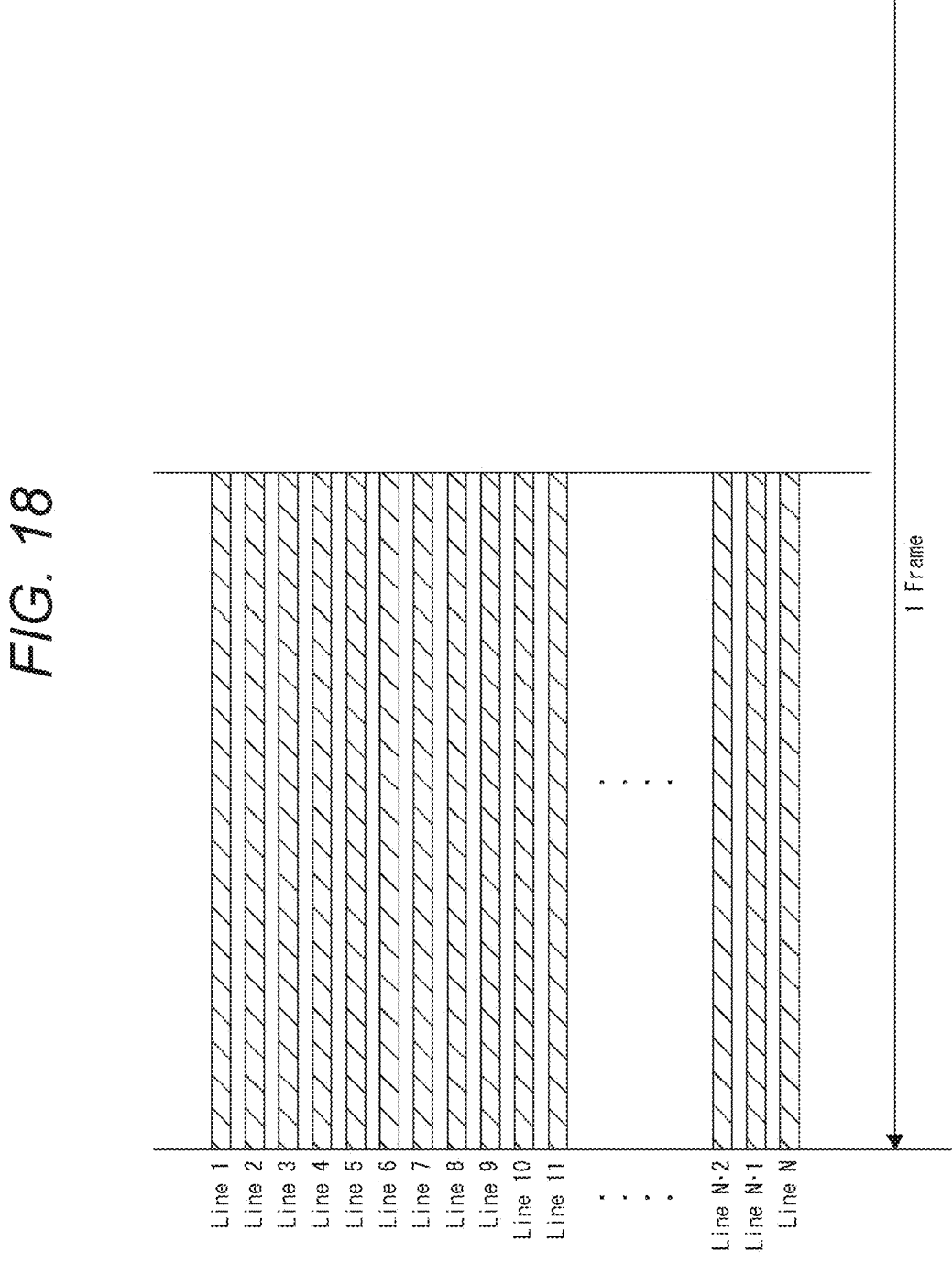
FIG. 18 is an explanatory diagram of exposure of a global shutter system.
Figure 19:
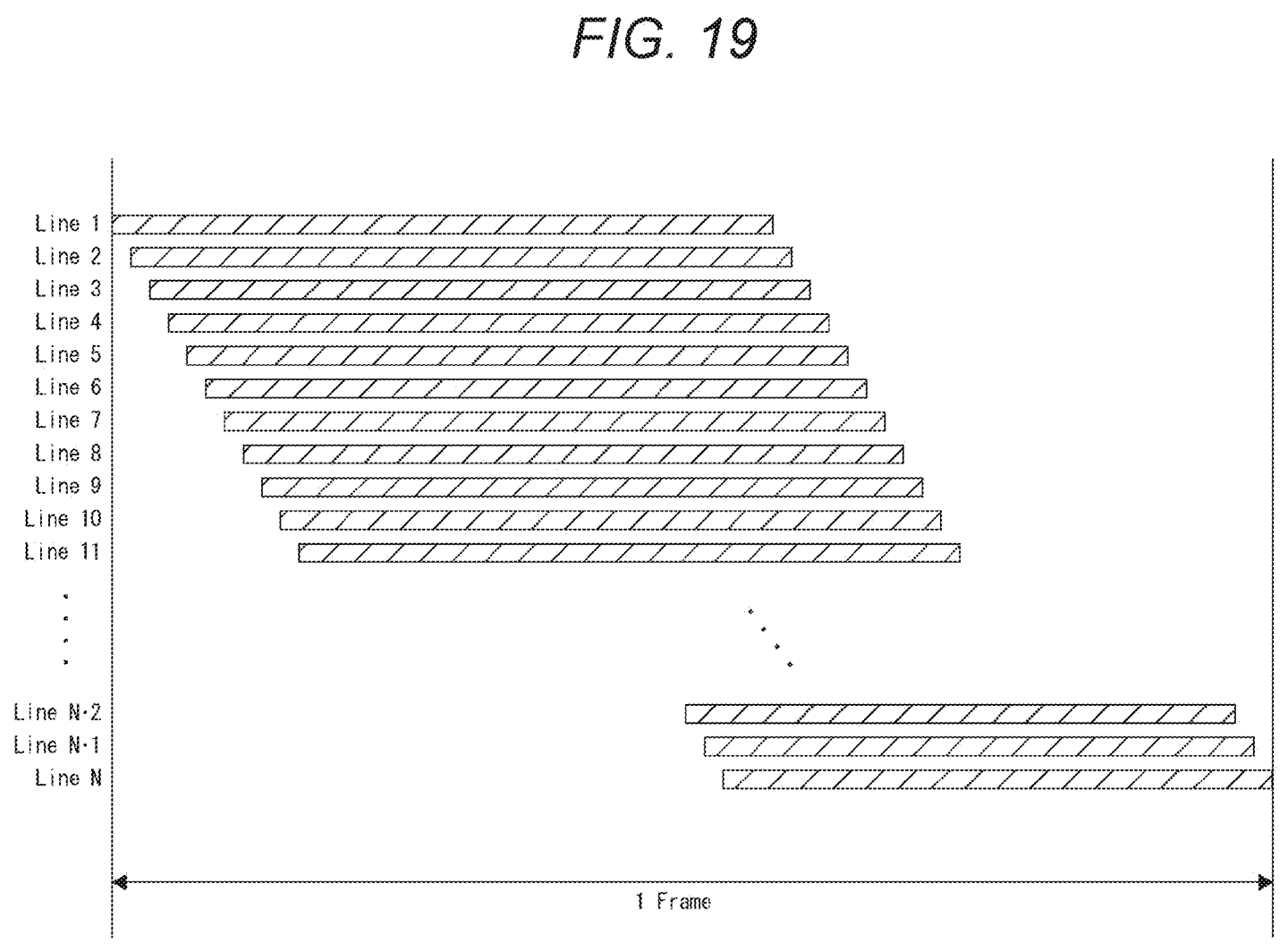

FIG. 18 schematically illustrates exposure in the global shutter system, and FIG. 19 schematically illustrates exposure in a rolling shutter system. A hatched bar indicates an exposure period of each horizontal line.

As is known, in the case of the global shutter system, the first line (LINE 1) to the last line (LINE N) are exposed simultaneously. On the other hand, in the case of the rolling shutter system, exposure is performed at timing at which the first line (LINE 1) to the final line (LINE N) are gradually shifted.

Regarding such a global shutter system and a rolling shutter system, a case where the switcher 600 switches the camera 502 to be the main line video vCm will be described.

Figure 20:
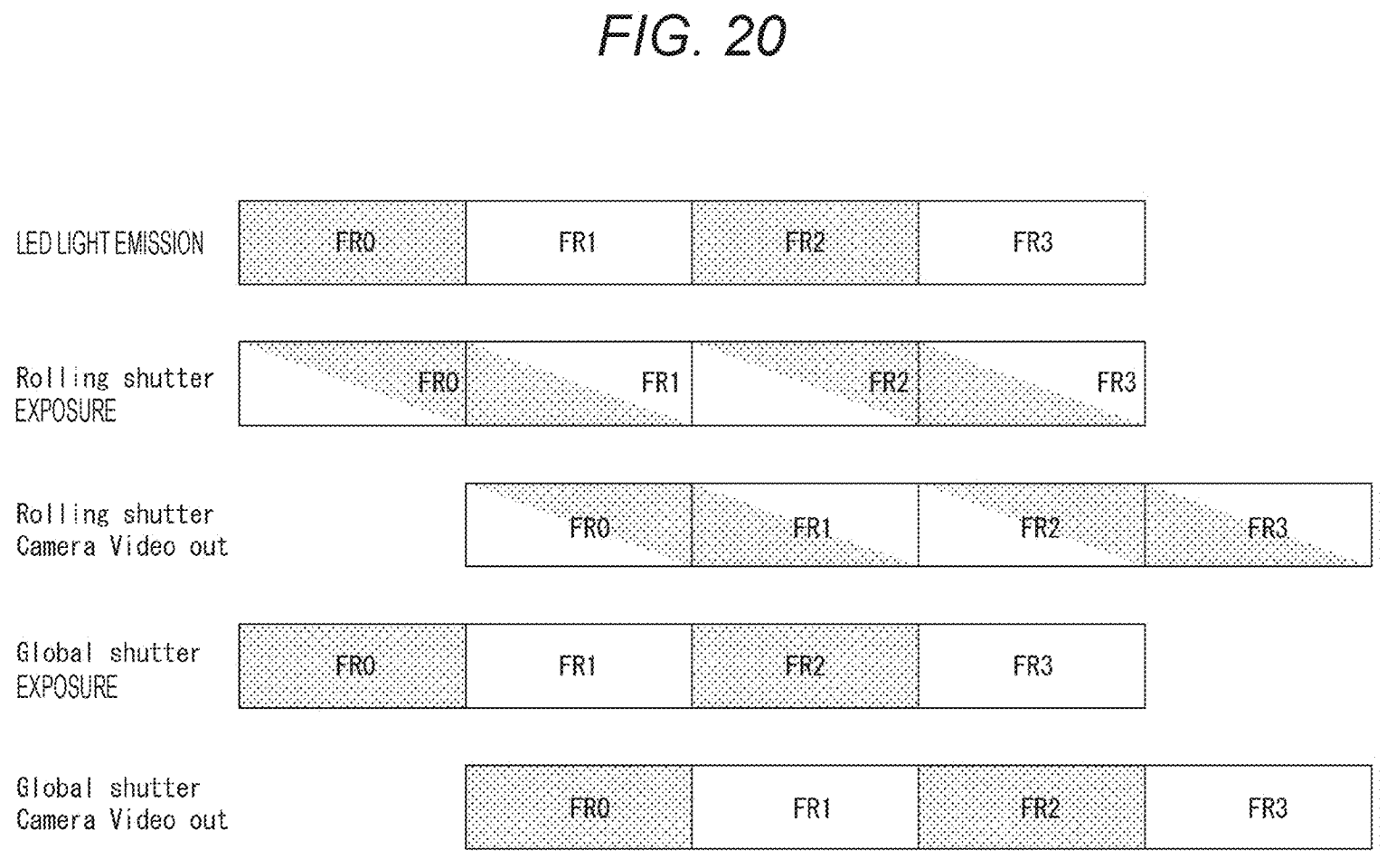

FIG. 20 illustrates each period of frames FR0, FR1, FR2, and FR3 displayed on the LED wall 505 as "LED light emission"

In this case, a state of the exposure and the output of the captured video vC in the camera 502 with the rolling shutter system is schematically illustrated, and a video of one frame is exposed over two preceding and following frames. This is not a problem unless switching is particularly performed, but when switching is performed in the switcher 600 in a certain frame, the video content becomes incorrect in the first frame after the switching. That is, the first frame after the switching is mixed with the video of the immediately preceding frame. This means that the videos of the inner frustum vBC not corresponding to the camera 502 for the main line video after switching are mixed.

On the other hand, a state of the exposure and the output of the captured video vC in the camera 502 with the global shutter system is also schematically illustrated, and, in this case, the exposure of one frame is completed in one frame period. Therefore, even when switching is performed in the switcher 600, different videos before and after the switching are not mixed.

From the above circumstances, each camera 502 of the present embodiment uses a camera with the global shutter system. However, even in a case where a camera with the rolling shutter system is used, if the shutter speed is increased, it is possible to avoid mixing of the images of the preceding and following frames.

Alternatively, each camera 502 may be a camera capable of switching between the rolling shutter system and the global shutter system.

Figure 21:
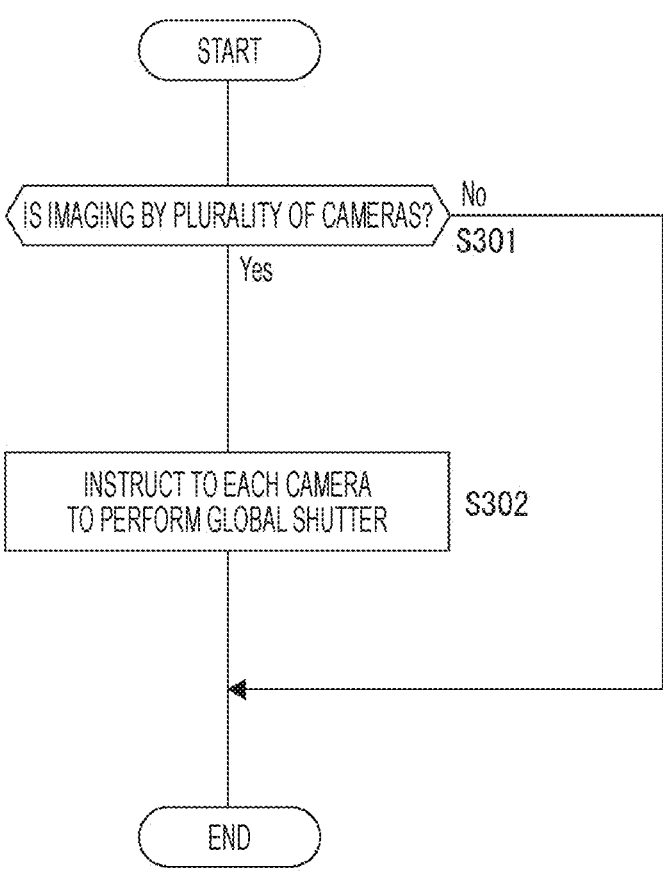
FIG. 21 is a flowchart of an example of control for the camera of the embodiment.

In this case, the control device in the imaging system 500 performs the process in FIG. 21.

In step S301, the control device determines whether or not the imaging system 500 is in a state of performing imaging by the plurality of cameras 502. In the case of imaging by one camera 502, no preliminary control is particularly performed.

On the other hand, when detecting that the plurality of cameras 502 is connected to the imaging system 500 to perform imaging, the control device outputs an instruction to each camera 502 to perform exposure by the global shutter system in step S302.

By performing such control, when the plurality of cameras 502 is used, all the cameras 502 operate in the global shutter system.

Note that the control device that performs the process in FIG. 21 only needs to be the information processing device 70 in the imaging system 500, and, for example, to be the rendering engine 520 or the SW controller 10.

<6. Summary and Modifications>

According to the above-described embodiments, the following effects can be obtained.

The switcher 600 of the embodiment includes the switch unit 11 (first switch unit) that receives, as video data to be displayed on the LED wall 505 (LED panel 506), a plurality of pieces of video data (for example, background video vBa and vBb) including video content corresponding to each of the plurality of cameras 502 as input, selects one of the plurality of pieces of video data, and outputs the selected video data. Furthermore, the switcher 600 includes the switch unit 12 (second switch unit) that receives a plurality of pieces of video data (for example, the captured video vCa, vCb) obtained by capturing the video displayed on the LED wall 505 by the plurality of cameras 502 as input, selects one of the plurality of pieces of video data, and outputs the selected video data. Furthermore, the switcher 600 includes the SW controller 10 that performs control to cause the switch unit 11 to execute switching of the video data in response to the trigger of the video switching, and, after a predetermined switching delay time Tdl elapses, to cause the switch unit 12 to execute switching to the video data by the camera corresponding to the video data after switching in the switch unit 11.

For example, when the camera 502a is switched to camera 502b, the switch unit 11 switches the background video vBa to the background video vBb including the inner frustum vBC of the camera 502b, and the switch unit 12 performs switching to the captured video vC2 when the captured video vC2 is input to the switcher 600. As a result, the captured video vC2 to be the main line video vCm output from the switch unit 12 becomes a video including the inner frustum vBC correctly corresponding to the camera 502b at this point of time.

Therefore, in a case where the camera is switched, it is also possible to prevent the video in which the inner frustum vBC of the camera before the switching remains from being output as the main line video vCm, so that it is possible to realize high quality video output.

Furthermore, since the background videos vBa and vBb corresponding to the plurality of cameras 502 are always rendered, selected by the switcher 600, and supplied to LED wall 505, the inner frustum vBC does not overlap on the LED wall 505 at the time of imaging by the plurality of cameras. Therefore, the captured video vC is not mixed with the video of the inner frustum vBC of the other camera 502.

Furthermore, as in the embodiment, the background videos vBa and vBb corresponding to the respective cameras 502 are always generated and output to the switcher 600. That is, the rendering of the background video vB corresponding to the newly selected camera 502 is not started at the camera switching timing. As a result, the switching delay time Tdl does not include a rendering delay. Therefore, the switching delay time Tdl does not become long, and the main line video vCm is switched in a short delay time after the trigger of the camera switching.

Each of the plurality of pieces of video data input to the switch unit 11 of the switcher 600 of the embodiment are the background video vB including the video content rendered according to the position and imaging direction of the corresponding camera 502 with respect to the LED wall 505.

For example, the background videos vBa and vBb rendered by the rendering units 21 and 22 are input to the switcher 600. That is, the background videos vBa and vBb are images each including the inner frustum vBC rendered according to the positions and imaging directions of the cameras 502a and 502b, respectively. This enables appropriate imaging as a virtual production in which the background is displayed on the LED wall 505 and imaged by the plurality of cameras 502.

The plurality of pieces of video data input to the switch unit 12 of the embodiment is the captured video vc obtained by capturing the video on the LED wall 505 and the object (the performer 510 and the like) as the foreground by each of the plurality of cameras 502.

For example, the captured videos vC1 and vC2 obtained by capturing the LED wall 505 and the foreground object with the cameras 502a and 502b are input to the switch unit 12 of the switcher 600, and one of the captured videos vC1 and vC2 is selected as the main line video vCm by the switch unit 12.

As a result, it is possible to appropriately switch the main line video as a virtual production in which the background is displayed on the LED wall 505 and imaged by the plurality of cameras 502.

In the embodiment, an example has been described in which the SW controller 10 sets the switching delay time Tdl on the basis of the LED-side operation mode and the camera-side operation mode.

The appropriate switching delay time Tdl is a time obtained by adding a time until the background video vB output from the switch unit 11 is displayed on the LED wall 505 and a time until the display is captured by the camera 502 and the captured video vC subjected to the signal processing is input to the switch unit 12. Therefore, these times are calculated from the operation mode regarding the display on the LED wall 505 and the operation mode regarding the imaging and signal processing of the camera 502, and are set as the switching delay time Tdl. As a result, switching of the switch unit 12 at an accurate timing is realized after switching of the switch unit 11.

In the embodiment, an example has been described in which the SW controller 10 acquires the LED-side operation mode and the camera-side operation mode by the operation input of the operator.

For example, an operator or the like inputs information of an operation mode related to the LED wall 505 of the imaging system 500 or an operation mode related to the camera 502, and the SW controller 10 of the switcher 600 performs calculation according to the input to set the switching delay time Tdl. As a result, the operator or the like inputs the display on the LED wall 505 and the setting state of imaging by the camera 502, whereby the appropriate switching delay time Tdl is set.

In the embodiment, an example has been described in which the SW controller 10 acquires the LED-side operation mode and the camera-side operation mode by communication (see FIG. 14).

For example, the switcher 600 communicates with the display controller 590, the LED processor 570, or the LED panel 506 to acquire an operation mode related to display on the LED wall 505. Furthermore, the switcher 600 communicates with the camera 502 and the camera signal processing unit 515 to acquire the operation mode information of the camera and the signal processing. As a result, it is possible to automatically set an appropriate switching delay time Tdl by intra-system communication.

In the embodiment, an example has been described in which the SW controller 10 sets the switching delay time Tdl on the basis of the measurement of the time until the video output from the switch unit 11 is input to the switch unit 12 (see FIG. 16).

By the switcher 600 counting the time until the video actually output from the switch unit 11 is input to the switch unit 12, the delay until the display on the LED wall 505 and the delay time of the video due to the processing of the camera 502 and the like can be known. Therefore, it is possible to set an appropriate switching delay time Tdl on the basis of this measurement.

In the embodiment, an example has also been described in which the switching delay time Tdl is a fixed value.

In the imaging system 500 in which the operation mode related to display on the LED wall 505 and the operation mode related to imaging by the camera 502 are not particularly changed, the appropriate switching delay time Tdl is always the same. In the switcher 600 in such a system, the SW controller 10 only needs to store the switching delay time Tdl as a fixed value.

In the embodiment, an example has also been described in which the SW controller 10 changes the switching delay time Tdl according to the operation input of the operator.

In a case where the switching delay time Tdl is a fixed value, a plurality of fixed values is stored, and the switching delay time Tdl can be switched by an operation input. As a result, it is possible to cope with a change in system settings and the like.

In the embodiment, an example has been described in which the plurality of captured videos vC captured by the plurality of cameras 502 is each input to the switch unit 12 via the delay buffer 15.

As illustrated in FIG. 13, the captured videos vC1, vC2, and vC3 are input to the switch unit 12 via the delay buffers 15*a*, 15*b*, and 15*c*, respectively. In this case, the input timings to the switch unit 12 can be made simultaneously by the buffer delay times DTa, DTb, and DTc in the delay buffers 15*a*, 15*b*, and 15*c*. That is, even in a case where the appropriate switching delay time Tdl is different in each camera 502 due to different models of cameras or the like, switching can be performed at an appropriate timing by aligning the delay times by the delay buffers 15*a*, 15*b*, and 15*c*.

In the embodiment, an example has been described in which the SW controller 10 sets the switching delay time Tdl by reflecting the setting of the buffer delay time of the delay buffer 15 (see FIG. 17).

In a case where the delay times of the captured videos vC1, vC2, and vC3 are aligned by the delay buffers 15*a*, 15*b*, and 15*c*, the buffer delay times DTa, DTb, and DTc may be a part of the switching delay time Tdl. Therefore, by setting the switching delay time Tdl according to the settings of the buffer delay times DTa, DTb, and DTc, the switching of the switch unit 12 is performed at an accurate timing.

Each of the plurality of cameras 502 of the embodiment is a camera that performs exposure by the global shutter system.

Since the captured video vC is captured by the global shutter system, videos between the preceding and following frames are not mixed when the switch unit 12 is switched. Therefore, a frame including the inner frustum of another camera is not generated at the switching timing.

In the embodiment, an example has been described in which all or some of the plurality of cameras 502 are switchable cameras capable of switching between exposure of the global shutter system and exposure of the rolling shutter system, and in a case where there is video input by the plurality of cameras 502, the control device such as the SW controller 10 instructs the switchable camera to perform exposure of the global shutter system (see FIG. 21).

In a case where imaging is performed by the plurality of cameras 502, control is performed such that imaging is executed by the global shutter system. As a result, even in a case where a camera capable of switching between the exposure of the global shutter system and the exposure of the rolling shutter system is used, it is possible to prevent videos between the preceding and following frames from being mixed at the time of switching of the switch unit 12.

A program of the embodiments is a program for causing a processor, for example, a CPU, a DSP, or the like, or a device including the processor to execute the process as illustrated in FIGS. 11, 14, 16, and 17 described above.

That is, the program of the embodiment is a program for causing the information processing device 70 to execute processing of causing the switch unit 11 to execute switching of the video data in response to the trigger of the video switching, and, after the predetermined switching delay time Tdl elapses, causing the switch unit 12 to execute switching to the video data by the camera 502 corresponding to the video data after the switching in the switch unit 11. Specifically, the program is a program to be executed by the SW controller of the switcher 600.

With such a program, the information processing device 70 that executes the above-described correction processing can be implemented by various computer apparatuses.

Such a program can be recorded in advance in an HDD as a recording medium built in a device such as a computer device, a ROM in a microcomputer having a CPU, or the like. Furthermore, such a program can be temporarily or permanently stored (recorded) in a removable recording medium such as a flexible disk, a compact disc read only memory (CD-ROM), a magneto optical (MO) disk, a digital versatile disc (DVD), a Blu-ray Disc (registered trademark), a magnetic disk, a semiconductor memory, or a memory card. Such a removable recording medium can be provided as what is called package software.

Furthermore, such a program can be installed from the removable recording medium into a personal computer and the like, or can be downloaded from a download site through a network such as a local area network (LAN) or the Internet.

Furthermore, such a program is suitable for providing the information processing device 70 and the switcher 600 of the embodiment in a wide range. For example, by downloading the program to a personal computer, a communication device, a portable terminal device such as a smartphone or a tablet, a mobile phone, a game device, a video device, a personal digital assistant (PDA), or the like, these devices can be caused to function as the information processing device 70 of the present disclosure.

Note that the effects described in the present description are merely examples and are not limited, and other effects may be provided.

Note that the present technology can also have the following configurations.

(1)

A switcher device, including:

a first switch unit that receives, as video data to be displayed on a display, a plurality of pieces of video data including video content corresponding to each of a plurality of cameras as input, selects one of the plurality of pieces of video data, and outputs the selected video data;

a second switch unit that receives a plurality of pieces of video data obtained by capturing a video displayed on the display by the plurality of cameras as input, selects one of the plurality of pieces of video data, and outputs the selected video data; and a control unit that performs control to cause the first switch unit to execute switching of video data in response to a trigger of video switching, and, after a predetermined switching delay time elapses, to cause the second switch unit to execute switching to video data by a camera corresponding to the video data after the switching in the first switch unit.

(2)

The switcher device according to (1), in which the plurality of pieces of video data input to the first switch unit each includes background video data including video content rendered according to a position and an imaging direction of a corresponding camera with respect to the display.

(3)

The switcher device according to (1) or (2), in which the plurality of pieces of video data input to the second switch unit includes video data obtained by capturing a video on the display and an object serving as a foreground of the display by each of the plurality of cameras.

(4)

The switcher device according to any one of (1) to (3), in which the control unit sets the switching delay time on the basis of operation mode information of the display and operation mode information related to imaging by the camera.

(5)

The switcher device according to (4), in which the control unit acquires the operation mode information of the display and the operation mode information related to imaging by the camera by operation input.

(6)

The switcher device according to (4), in which the control unit acquires the operation mode information of the display and the operation mode information related to imaging by the camera by communication.

(7)

The switcher device according to any one of (1) to (3), in which the control unit sets the switching delay time on the basis of measurement of time until the video output from the first switch unit is input to the second switch unit.

(8)

The switcher device according to any one of (1) to (3), in which the switching delay time includes a fixed value.

(9) The switcher device according to (8), in which the control unit changes the switching delay time according to an operation input.

(10)

The switcher device according to any one of (1) to (9), in which each of a plurality of pieces of video data captured by the plurality of cameras is input to the second switch unit via a delay buffer.

(11)

The switcher device according to (10), in which the control unit sets the switching delay time by reflecting setting of a delay time of a buffer of the delay buffer.

(12)

The switcher device according to any one of (1) to (11), in which each of the plurality of cameras includes a camera that performs exposure by a global shutter system.

(13)

The switcher device according to any one of (1) to (11), in which all or some of the plurality of cameras include switchable cameras capable of switching between exposure of a global shutter system and exposure of a rolling shutter system, and in a case where there is video input by the plurality of cameras, the control unit instructs the switchable camera to perform exposure of a global shutter system.

(14)

A method for controlling a switcher device, the switcher device including:

a first switch unit that receives, as video data to be displayed on a display, a plurality of pieces of video data including video content corresponding to each of a plurality of cameras as input, selects one of the plurality of pieces of video data, and outputs the selected video data; and a second switch unit that receives a plurality of pieces of video data in a case where a video displayed on the display is captured by the plurality of cameras as input, selects one of the plurality of pieces of video data, and outputs the selected video data, the method including causing the first switch unit to execute switching of video data in response to a trigger of video switching, and, after a predetermined switching delay time elapses, causing the second switch unit to execute switching to video data by a camera corresponding to the video data after the switching in the first switch unit.

(15)

An imaging system including:

a display;

a plurality of cameras that captures a video displayed on the display;

a plurality of rendering units that generates a plurality of pieces of video data including video content corresponding to each of the plurality of cameras; and a switcher device, in which the switcher device includes:

a first switch unit that receives a plurality of pieces of video data from the plurality of rendering units as input, selects one of the plurality of pieces of video data, and outputs the selected video data as video data to be displayed on the display;

a second switch unit that receives a plurality of pieces of video data each captured by the plurality of cameras as input, selects one of the plurality of pieces of video data, and outputs the selected video data; and a control unit that performs control to cause the first switch unit to execute switching of video data in response to a trigger of video switching, and, after a predetermined switching delay time elapses, to cause the second switch unit to execute switching to video data by a camera corresponding to the video data after the switching in the first switch unit.

REFERENCE SIGNS LIST

10 Switcher controller (SW controller)
11 Switch unit

12 Switch unit
15b, 15c Delay buffer
15a,
16 Video generator
17 Video detector
21, 22, 23 Rendering unit
30 Image sensor
70 Information processing device
71 CPU
500 Imaging system
502 Camera
505 LED wall
506 LED panel
515a, 515b Camera signal processing unit
520 Rendering engine
560 Camera tracker
570 LED processor
590 Display controller
600 Switcher
Tdl Switching delay time
DTa, DTb, DTC Buffer delay time
VB Background video
vBC Capturing region video (inner frustum)
vC, vCa, vCb, vCc Captured video
vCm Main line video

The invention claimed is:

1. A switcher device, comprising: circuitry configured to:
receive, as background video data to be displayed on a display, a plurality of pieces of background video data including video content corresponding to each of a plurality of cameras as input, select one of the plurality of pieces of background video data, and output the selected background video data;
receive a plurality of pieces of captured video data obtained by capturing a background video displayed on the display by the plurality of cameras as input, select one of the plurality of pieces of captured video data, and output the selected captured video data; and
execute switching of background video data in response to a trigger of video switching, and, after a predetermined switching delay time elapses, execute switching to captured video data by a camera corresponding to the background video data after the switching of the background video data in response to the trigger of video switching.

2. The switcher device according to claim 1, wherein the plurality of pieces of background video data to be displayed on the display each includes background video data including video content rendered according to a position and an imaging direction of a corresponding camera with respect to the display.

3. The switcher device according to claim 1, wherein the plurality of pieces of captured video data obtained by capturing the background video displayed on the display includes video data obtained by capturing the background video on the display and an object serving as a foreground of the display by each of the plurality of cameras.

4. The switcher device according to claim 1, wherein the circuitry is further configured to set the switching delay time on a basis of operation mode information of the display and operation mode information related to imaging by the camera.

5. The switcher device according to claim 4, wherein the circuitry is further configured to acquire the operation mode information of the display and the operation mode information related to imaging by the camera by operation input.

6. The switcher device according to claim 4, wherein the circuitry is further configured to acquire the operation mode information of the display and the operation mode information related to imaging by the camera by communication.

7. The switcher device according to claim 1, wherein the circuitry is further configured to set the switching delay time on a basis of measurement of time until the output of the selected background video data is input to execute the switching of the captured video data in response to the trigger of video switching.

8. The switcher device according to claim 1, wherein the switching delay time includes a fixed value.

9. The switcher device according to claim 8, wherein the circuitry is further configured to change the switching delay time according to an operation input.

10. The switcher device according to claim 1, wherein each of a plurality of pieces of captured video data captured by the plurality of cameras is input via a delay buffer to execute the switching of the captured video data in response to the trigger of video switching.

11. The switcher device according to claim 10, wherein the circuitry is further configured to set the switching delay time by reflecting setting of a delay time of a buffer of the delay buffer.

12. The switcher device according to claim 1, wherein each of the plurality of cameras includes a camera that performs exposure by a global shutter system.

13. The switcher device according to claim 1, wherein
all or some of the plurality of cameras include switchable cameras capable of switching between exposure of a global shutter system and exposure of a rolling shutter system, and
in a case where there is video input by the plurality of cameras, the circuitry is further configured to instruct the switchable camera to perform exposure of a global shutter system.

14. A method for controlling a switcher device, the method comprising:
receiving, as background video data to be displayed on a display, a plurality of pieces of background video data including video content corresponding to each of a plurality of cameras as input, selecting one of the plurality of pieces of background video data, and outputting the selected background video data;
receiving a plurality of pieces of captured video data in a case where a background video displayed on the display is captured by the plurality of cameras as input, select one of the plurality of pieces of captured video data, and outputting the selected captured video data; and
the method comprising causing the first switch unit to execute switching of background video data in response to a trigger of video switching, and, after a predetermined switching delay time elapses, executing switching to captured video data by a camera corresponding to the background video data after the switching of the background video data in response to the trigger of video switching.

15. An imaging system comprising:
a display;
a plurality of cameras that captures a background video displayed on the display;
a plurality of renderers that generates a plurality of background pieces of video data including video content corresponding to each of the plurality of cameras; and
a switcher device, wherein the switcher device includes:

circuitry configured to:

receive a plurality of pieces of background video data from the plurality of renderers as input, select one of the plurality of pieces of background video data, and 5 output the selected background video data as video data to be displayed on the display;

receive a plurality of pieces of captured video data each captured by the plurality of cameras as input, select one of the plurality of pieces of captured video data, 10 and output the selected captured video data; and execute switching of background video data in response to a trigger of video switching, and, after a predetermined switching delay time elapses, to execute switching to captured video data by a camera 15 corresponding to the video data after the switching of the background video data in response to the trigger of video switching.

* * * * *